United States Patent
Hirata et al.

(10) Patent No.: US 11,770,625 B2
(45) Date of Patent: Sep. 26, 2023

(54) DATA PROCESSING DEVICE AND DATA PROCESSING METHOD

(71) Applicant: SONY GROUP CORPORATION, Tokyo (JP)

(72) Inventors: Ayaka Hirata, Tokyo (JP); Kei Nakagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 67 days.

(21) Appl. No.: 17/440,347

(22) PCT Filed: Mar. 13, 2020

(86) PCT No.: PCT/JP2020/011054
§ 371 (c)(1),
(2) Date: Sep. 17, 2021

(87) PCT Pub. No.: WO2020/195934
PCT Pub. Date: Oct. 1, 2020

(65) Prior Publication Data
US 2022/0201204 A1    Jun. 23, 2022

(30) Foreign Application Priority Data

Mar. 27, 2019   (JP) ................................. 2019-059818

(51) Int. Cl.
*H04N 23/951*   (2023.01)
*B60R 1/22*   (2022.01)
(Continued)

(52) U.S. Cl.
CPC ............. *H04N 23/951* (2023.01); *B60R 1/22* (2022.01); *G06V 20/58* (2022.01); *H04N 23/84* (2023.01);
(Continued)

(58) Field of Classification Search
CPC ...... H04N 23/951; H04N 23/84; H04N 25/50; H04N 23/60; H04N 25/40; H04N 25/745;
(Continued)

(56) References Cited

U.S. PATENT DOCUMENTS

| | | | |
|---|---|---|---|
| 2016/0094796 A1 | 3/2016 | Govil | |
| 2017/0267178 A1 | 9/2017 | Shiga et al. | |
| 2021/0152757 A1* | 5/2021 | Wakabayashi | H04N 25/50 |
| 2022/0038645 A1* | 2/2022 | Takahashi | H04N 25/00 |

FOREIGN PATENT DOCUMENTS

| | | |
|---|---|---|
| CN | 106537892 A | 3/2017 |
| CN | 107079115 A | 8/2017 |

(Continued)

OTHER PUBLICATIONS

International Search Report and Written Opinion of PCT Application No. PCT/JP2020/011054, dated Jun. 9, 2020, 08 pages of ISRWO.

*Primary Examiner* — Farzana Hossain
(74) *Attorney, Agent, or Firm* — CHIP LAW GROUP

(57) ABSTRACT

The present technology relates to a data processing device and a data processing method capable of suppressing power consumption. A vehicle information acquisition unit acquires vehicle information that can be acquired by a vehicle, and a control unit controls, according to the vehicle information, a frame rate of frame data generated on the basis of event data representing the occurrence of an event that occurs in an accumulation time from a start of frame generation to an end of frame generation and is a change in an electrical signal of a pixel that generates the electrical signal by performing photoelectric conversion. A data processing unit generates the frame data of the frame rate controlled by the control unit. In the present technology, the present technology can be applied to, for example, a case (Continued)

where frame data is generated from event data output by a dynamic vision sensor (DVS).

16 Claims, 26 Drawing Sheets

(51) Int. Cl.
*G06V 20/58* (2022.01)
*H04N 23/84* (2023.01)

(52) U.S. Cl.
CPC .............. *G06T 2207/10024* (2013.01); *G06T 2207/30252* (2013.01)

(58) Field of Classification Search
CPC . H04N 5/33; B60R 1/22; G06V 20/58; G06V 2201/08; G06V 10/96; G06T 2207/10024; G06T 2207/30252
See application file for complete search history.

(56) References Cited

FOREIGN PATENT DOCUMENTS

| | | |
|---|---|---|
| JP | 5571125 B2 | 8/2014 |
| JP | 2015-226255 A | 12/2015 |
| JP | 2017-535999 A | 11/2017 |
| WO | 2015/182753 A1 | 12/2015 |
| WO | 2016/053795 A1 | 4/2016 |

* cited by examiner

DATA PROCESSING DEVICE AND DATA PROCESSING METHOD

CROSS REFERENCE TO RELATED APPLICATIONS

This application is a U.S. National Phase of International Patent Application No. PCT/JP2020/011054 filed on Mar. 13, 2020, which claims priority benefit of Japanese Patent Application No. JP 2019-059818 filed in the Japan Patent Office on Mar. 27, 2019. Each of the above-referenced applications is hereby incorporated herein by reference in its entirety.

TECHNICAL FIELD

The present technology relates to a data processing device, a data processing method, and a program, and particularly, relates to, a data processing device, a data processing method, and a program capable of suppressing power consumption, for example.

BACKGROUND ART

Techniques for integrating signals provided by event-based visual sensors to generate an active map and analyzing the active map to obtain a model of a road surface on which a vehicle is to travel have been proposed (see Patent Document 1, for example).

Here, an image sensor that captures an image in synchronization with a vertical synchronization signal and outputs frame data that is image data of one frame (screen) in the cycle of the vertical synchronization signal can be referred to as a synchronous image sensor. On the other hand, since the event-based visual sensor outputs a signal when an event occurs, the event-based visual sensor can be referred to as an asynchronous image sensor. The asynchronous image sensor is called a dynamic vision sensor (DVS), for example.

CITATION LIST

Patent Document

Patent Document 1: Japanese Patent No. 5571125

SUMMARY OF THE INVENTION

Problems to be Solved by the Invention

By the way, for example, image processing such as object recognition is performed on frame data. Therefore, in order to perform image processing on the signal output from the DVS, it is necessary to generate frame data from the signal output from the DVS.

For example, when a DVS is mounted on a vehicle for driving assistance or the like, frame data of a high frame rate may be required. However, when frame data of a high frame rate is always generated, power consumption increases.

The present technology has been made in view of such a situation, and an object thereof is to suppress power consumption.

Solutions to Problems

A data processing device and a program according to the present technology are a data processing device including: a vehicle information acquisition unit that acquires vehicle information that can be acquired by a vehicle; a control unit that controls, according to the vehicle information, a frame rate of frame data generated on the basis of event data representing the occurrence of an event that occurs in an accumulation time from a start of frame generation to an end of frame generation and is a change in an electrical signal of a pixel that generates the electrical signal by performing photoelectric conversion; and a data processing unit that generates the frame data of the frame rate, or a program for causing a computer to function as such a data processing device.

A data processing method of the present technology is a data processing method including: acquiring vehicle information that can be acquired by a vehicle; controlling, according to the vehicle information, a frame rate of frame data generated on the basis of event data representing the occurrence of an event that occurs in an accumulation time from a start of frame generation to an end of frame generation and is a change in an electrical signal of a pixel that generates the electrical signal by performing photoelectric conversion; and generating the frame data of the frame rate.

In the data processing device, the data processing method, and the program of the present technology, vehicle information that can be acquired by a vehicle is acquired, and a frame rate of frame data generated on the basis of event data representing the occurrence of an event that occurs in an accumulation time from a start of frame generation to an end of frame generation and is a change in an electrical signal of a pixel that generates the electrical signal by performing photoelectric conversion is controlled according to the vehicle information. The frame data of the frame rate is generated.

The data processing device may be an independent device or an internal block constituting one device.

Furthermore, the program can be distributed by being transmitted via a transmission medium or by being recorded in a recording medium.

MODE FOR CARRYING OUT THE INVENTION

<Sensor Module to which Present Technology is Applied>

Figure 1:
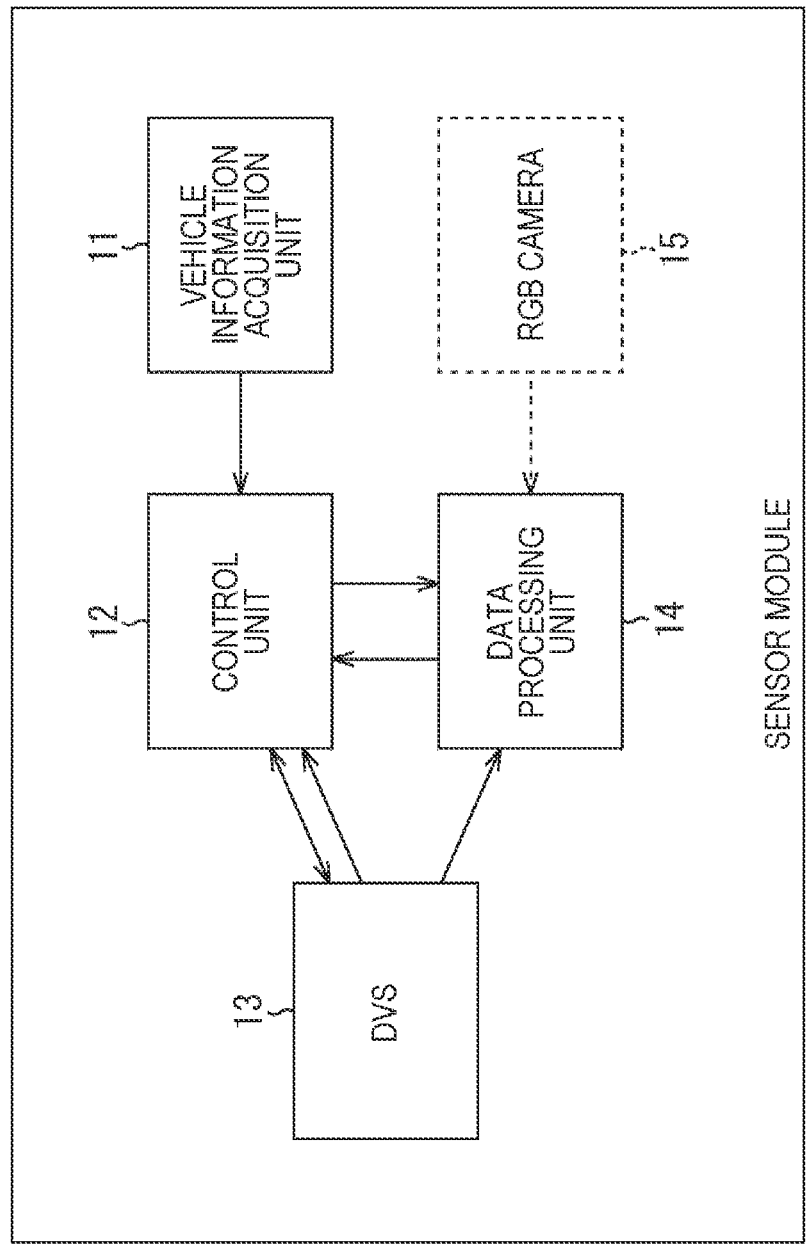
FIG. 1 is a block diagram illustrating a configuration example of an embodiment of a sensor module to which the present technology is applied.

FIG. 1 is a block diagram illustrating a configuration example of an embodiment of a sensor module to which the present technology is applied.

In FIG. 1, a sensor module is mounted on a vehicle (not illustrated), and functions as a data processing device that generates frame data that is image data in a frame format according to event data representing the occurrence of an event that is a change in an electrical signal of a pixel that generates an electrical signal by performing photoelectric conversion.

Hereinafter, the vehicle on which the sensor module is mounted is also referred to as a host vehicle.

The sensor module includes a vehicle information acquisition unit 11, a control unit 12, a DVS 13, and a data processing unit 14.

The vehicle information acquisition unit 11 acquires vehicle information and supplies the vehicle information to the control unit 12. The vehicle information means information that can be acquired by the host vehicle, and includes, for example, information regarding the host vehicle and information on the surroundings (environment) the host vehicle. Examples of the information regarding the host vehicle include a vehicle speed of the host vehicle and steering wheel information (a rotation angle, an angular acceleration, and the like of the steering wheel) on an operation of the steering wheel. Examples of the information on the surroundings of the host vehicle include a relative speed of an object existing around the host vehicle with respect to the host vehicle.

The control unit 12 controls the DVS 13 and the data processing unit 14.

For example, the control unit 12 controls the frame rate of the frame data generated by the data processing unit 14, that is, the frame interval representing the interval between the pieces of frame data generated continuously, according to the vehicle information from the vehicle information acquisition unit 11. The frame interval is represented by time that is the reciprocal of the frame rate.

Here, the frame data is generated on the basis of event data representing the occurrence of an event that occurs in the accumulation time from the start of frame generation to the end of frame generation and is a change in the electrical signal of the pixel that generates the electrical signal by performing photoelectric conversion. The frame interval of the frame data is equal to the interval from the start of generation of first frame data to the start of generation of the next second frame data, the interval from the end of generation of the first frame data to the end of generation of the second frame data, or the like. The frame interval can be controlled by a start interval or a frame width. The start interval represents the interval of the timings at which generation of frame data of one frame is started, that is, the interval from the start of generation of first frame data to the start of generation of the next second frame data. The frame width represents the time from the start of frame generation of frame data of one frame to the end of frame generation.

The control unit 12 can control the frame interval and the like according to, for example, the number of events per unit time specified from the event data supplied from the DVS 13, the recognition result (object recognition result) of object recognition supplied from the data processing unit 14, and the like.

The DVS 13 includes pixels that generate electrical signals by performing photoelectric conversion on incident light, and the pixels perform imaging for generating electrical signals by performing photoelectric conversion on incident light. Furthermore, the DVS 13 generates event data representing the occurrence of an event that is a change in the electrical signal of the pixel, and supplies the event data to the control unit 12 and the data processing unit 14. In addition, the DVS 13 can generate a pixel signal serving as a pixel value of an image from the electrical signal of the pixel and supply the pixel signal to the data processing unit 14. The sensor module is attached to the host vehicle so that, for example, the DVS 13 can image the front of the host vehicle.

Here, an image sensor that performs imaging in synchronization with a vertical synchronization signal and outputs frame data that is image data of one frame (screen) at the cycle of the vertical synchronization signal is referred to as a synchronous image sensor. Since the DVS 13 does not generate (output) the event data in synchronization with the vertical synchronization signal, it can be referred to as an asynchronous (image sensor) in contrast to the synchronous image sensor.

As described above, the DVS 13 can generate and output the frame data at the cycle of the vertical synchronization signal, similarly to the synchronous image sensor, in addition to the event data. Further, the DVS 13 can output the electrical signal of the pixel in which an event has occurred together with the event data as a pixel signal serving as a pixel value of the pixel of the frame data.

The data processing unit 14 performs data processing of generating frame data according to the event data from the DVS 13, image processing such as object recognition for the frame data including the pixel signals from the DVS 13 or the frame data generated according to the event data from the DVS 13, and various other kinds of necessary data processing.

In a case of generating frame data according to the event data from the DVS 13, the data processing unit 14 generates frame data of a frame interval or the like controlled by the control unit 12. Furthermore, the data processing unit 14 performs object recognition for the frame data, and supplies the object recognition result to the control unit 12.

The sensor module can be provided with an RGB camera 15 that outputs frame data of a color image. In a case where the RGB camera 15 is provided in the sensor module, the data processing unit 14 can perform object recognition using the frame data of a color image output from the RGB camera 15 as necessary in addition to the frame data generated from the event data.

<Configuration Example of Sensor Unit 21>

Figure 2:
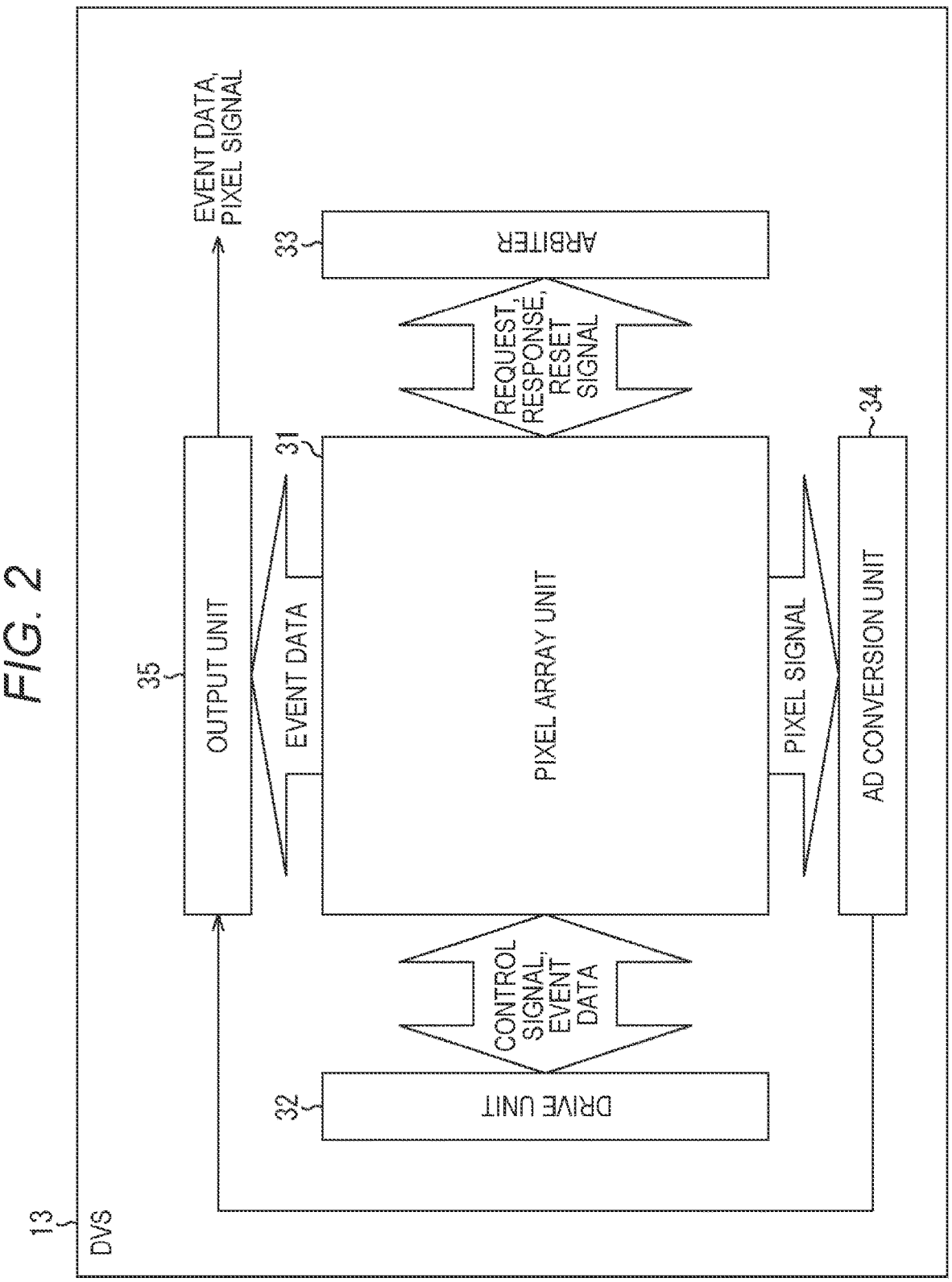
FIG. 2 is a block diagram illustrating a configuration example of a DVS 13.

FIG. 2 is a block diagram illustrating a configuration example of the DVS 13 in FIG. 1.

The DVS 13 includes a pixel array unit 31, a drive unit 32, an arbiter 33, an analog to digital (AD) conversion unit 34, and an output unit 35.

The pixel array unit 31 is configured by arranging a plurality of pixels 51 (FIG. 3) in a two-dimensional lattice pattern. In a case where a change exceeding a predetermined threshold (including a change equal to or greater than the threshold as necessary) occurs in a photocurrent as an electrical signal generated by photoelectric conversion of the pixel 51, the pixel array unit 31 detects the change in the photocurrent as an event. In a case where an event is detected, the pixel array unit 31 outputs a request for requesting the output of event data representing the occurrence of the event to the arbiter 33. Then, in a case where the pixel array unit 31 receives a response representing permission for the output of the event data from the arbiter 33, the pixel array unit 31 outputs the event data to the drive unit 32 and the output unit 35. Furthermore, the pixel array unit 31 outputs a pixel signal as an electrical signal of the pixel 51 in which the event is detected to the AD conversion unit 34.

The drive unit 32 drives the pixel array unit 31 by supplying a control signal to the pixel array unit 31. For example, the drive unit 32 drives the pixel 51 to which the event data has been output from the pixel array unit 31, and supplies (outputs) the pixel signal of the pixel 51 to the AD conversion unit 34.

The arbiter 33 arbitrates a request for requesting the output of the event data from the pixel array unit 31, and supplies a response representing permission or non-permission of the output of the event data and a reset signal for resetting the event detection to the pixel array unit 31.

The AD conversion unit 34 includes, for example, a single-slope AD converter (ADC) (not illustrated) for each column of a pixel block 41 (FIG. 3) to be described later. In the ADC of each column, the AD conversion unit 34 performs AD conversion on the pixel signal of the pixel 51 of the pixel block 41 of the column, and supplies the converted signal to the output unit 35. The AD conversion unit 34 can perform correlated double sampling (CDS) together with AD conversion of the pixel signal.

The output unit 35 performs necessary processing on the pixel signal from the AD conversion unit 34 and the event data from the pixel array unit 31, and outputs the processed pixel signal and the event data.

Here, since the change in the photocurrent generated in the pixel 51 can also be regarded as a change in the light amount of the light incident on the pixel 51, the event can also be referred to be a change in the light amount of the pixel 51 (change in the light amount exceeding the threshold).

The event data representing the occurrence of the event includes at least position information (coordinates or the like) indicating the position of the pixel block 41 in which the light amount change as the event has occurred. In addition, the event data can include the polarity (positive or negative) of the light amount change.

For a series of event data output at the timing when an event occurs from the pixel array unit 31, it can be said that the event data implicitly includes time information representing the (relative) time when the event occurs as long as the interval between the pieces of event data is maintained as it is at the time when the event occurs. However, when the interval between the pieces of event data is not maintained as it is at the time of occurrence of the event due to the event data being stored in the memory or the like, the time information implicitly included in the event data is lost. Therefore, before the interval between the pieces of event data is not maintained as it is at the time of occurrence of the event, the output unit 35 includes, in the event data, time information representing the (relative) time at which the event has occurred, such as a time stamp. The process of including the time information in the event data can be performed in any block other than the output unit 35 as long as the time information implicitly included in the event data is not lost.

<Configuration Example of Pixel Array Unit 31>

Figure 3:
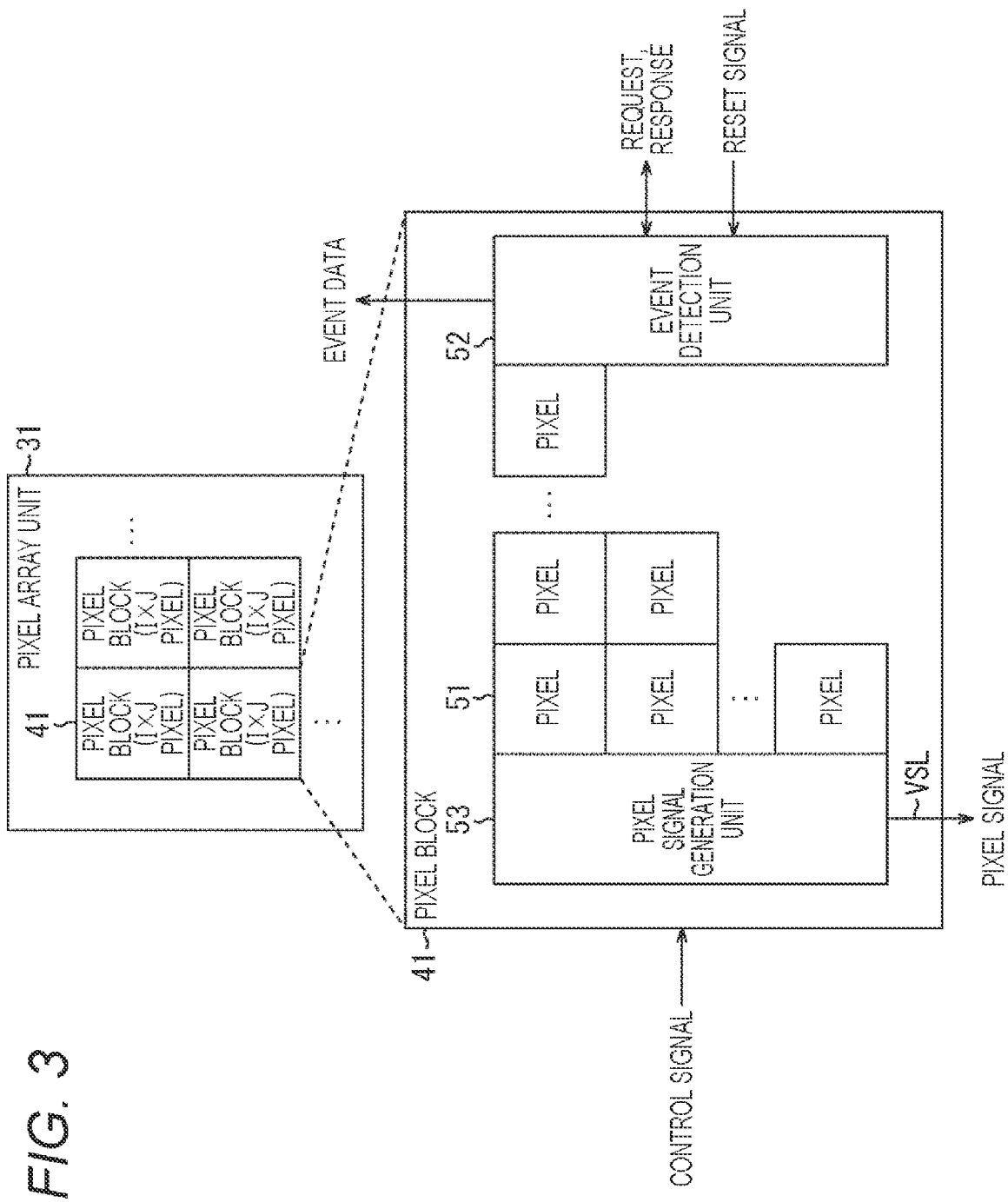
FIG. 3 is a block diagram illustrating a configuration example of a pixel array unit 31.

FIG. 3 is a block diagram illustrating a configuration example of the pixel array unit 31 in FIG. 2.

The pixel array unit 31 includes a plurality of pixel blocks 41. The pixel block 41 includes one or more I×J pixels 51 arranged in I rows×J columns (I and J are integers), an event detection unit 52, and a pixel signal generation unit 53. One or more pixels 51 in the pixel block 41 shares the event detection unit 52 and the pixel signal generation unit 53. Furthermore, a vertical signal line (VSL) that connects the pixel block 41 and the ADC of the AD conversion unit 34 is wired for each column of the pixel block 41.

The pixel 51 receives incident light from a subject, performs photoelectric conversion, and generates a photocurrent as an electrical signal. The pixel 51 supplies the photocurrent to the event detection unit 52 under the control of the drive unit 32.

The event detection unit 52 detects a change in the photocurrent from each of the pixels 51 exceeding a predetermined threshold as an event. In a case where an event is detected, the event detection unit 52 supplies a request for requesting output of event data representing the occurrence of the event to the arbiter 33 (FIG. 2). Then, when receiving a response indicating that the output of the event data is permitted in response to the request from the arbiter 33, the event detection unit 52 outputs the event data to the drive unit 32 and the output unit 35. A reset signal is supplied from the arbiter 33 to the event detection unit 52, and the event detection unit 52 operates in response to the reset signal from the arbiter 33.

In a case where an event is detected in the event detection unit 52, the pixel signal generation unit 53 generates, as a pixel signal, a voltage corresponding to a charge as an electrical signal obtained by photoelectric conversion of the pixel 51 under the control of the drive unit 32, and supplies the voltage to the AD conversion unit 34 via the VSL.

Here, detecting a change in the photocurrent exceeding the predetermined threshold as an event can be regarded as simultaneously detecting that there is no change in the photocurrent exceeding the predetermined threshold as an event. The pixel signal generation unit 53 can generate the pixel signal in a case where it is detected that there is no change exceeding the predetermined threshold of the photocurrent as the event in addition to a case where a change exceeding the predetermined threshold of the photocurrent as the event is detected.

<Configuration Example of Pixel Block 41>

Figure 4:
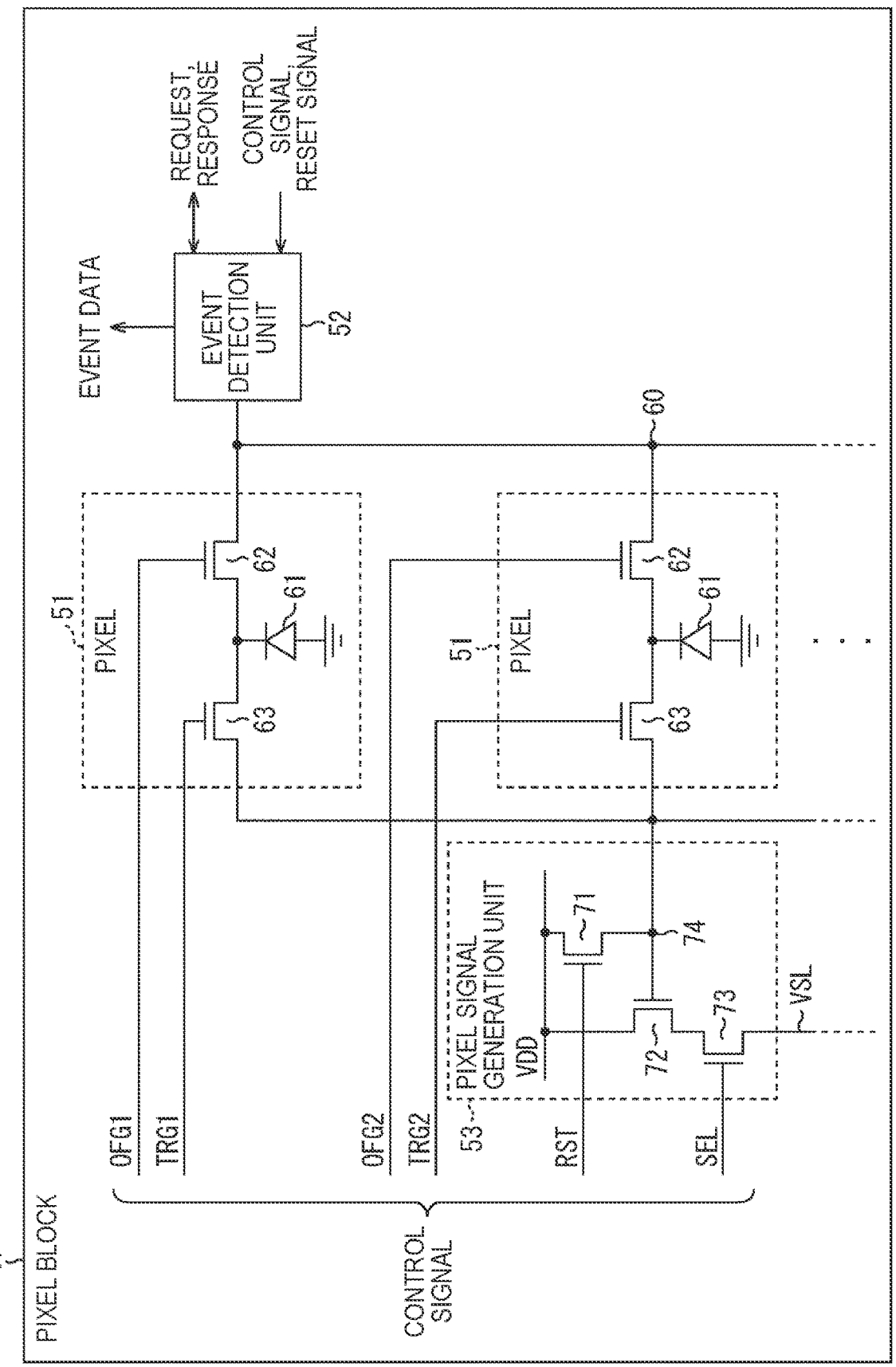
FIG. 4 is a circuit diagram illustrating a configuration example of a pixel block 41.

FIG. 4 is a circuit diagram illustrating a configuration example of the pixel block 41.

As described with reference to FIG. 3, the pixel block 41 includes the pixel 51, the event detection unit 52, and the pixel signal generation unit 53.

The pixel 51 includes a photoelectric conversion element 61 and transfer transistors 62 and 63.

The photoelectric conversion element 61 includes, for example, a photodiode (PD), receives incident light, and photoelectrically converts the incident light to generate a charge.

The transfer transistor 62 includes, for example, a negative (N) type metal-oxide-semiconductor (MOS) field effect transistor (FET). The transfer transistor 62 constituting the n-th pixel 51 among the I×J pixels 51 constituting the pixel block 41 is turned on/off according to a control signal ORGn supplied from the drive unit 32 (FIG. 2). When the transfer transistor 62 is turned on, the charge generated by the photoelectric conversion element 61 is transferred (supplied) to the event detection unit 52 as photocurrent.

The transfer transistor 63 includes, for example, an N-type metal oxide semiconductor (NMOS) FET. The transfer transistor 63 constituting the n-th pixel 51 among the I×J pixels 51 constituting the pixel block 41 is turned on/off according to a control signal (transfer signal) TRGn supplied from the drive unit 32. When the transfer transistor 63 is turned on, the charge generated by the photoelectric conversion element 61 is transferred to the FD 74 of the pixel signal generation unit 53.

The I×J pixels 51 constituting the pixel block 41 are connected to the event detection unit 52 constituting the pixel block 41 via the node 60. Therefore, the photocurrent generated in (the photoelectric conversion element 61 of) the pixel 51 is supplied to the event detection unit 52 via the node 60. As a result, the event detection unit 52 is supplied with the sum of the photocurrents of all the pixels 51 in the pixel block 41. Therefore, in the event detection unit 52, a change in the sum of photocurrents supplied from the I×J pixels 51 constituting the pixel block 41 is detected as an event.

The pixel signal generation unit 53 includes a reset transistor 71, an amplification transistor 72, a selection transistor 73, and a floating diffusion (FD) 74.

The reset transistor 71, the amplification transistor 72, and the selection transistor 73 include, for example, an N-type MOS FET.

The reset transistor 71 is turned on/off according to a control signal RST supplied from the drive unit 32 (FIG. 2). When the reset transistor 71 is turned on, the FD 74 is connected to the power supply VDD, and the charge accumulated in the FD 74 is discharged to the power supply VDD. As a result, the FD 74 is reset.

A gate of the amplification transistor 72 is connected to the FD 74, a drain thereof is connected to the power supply VDD, and a source thereof is connected to the VSL via the selection transistor 73. The amplification transistor 72 is a source follower, and outputs a voltage (electrical signal) corresponding to the voltage of the FD 74 supplied to the gate to the VSL via the selection transistor 73.

The selection transistor 73 is turned on/off according to a control signal SEL supplied from the drive unit 32. When the selection transistor 73 is turned on, a voltage corresponding to the voltage of the FD 74 from the amplification transistor 72 is output to the VSL.

The FD 74 accumulates the charge transferred from the photoelectric conversion element 61 of the pixel 51 via the transfer transistor 63, and converts the charge into a voltage.

For the pixel 51 and the pixel signal generation unit 53 configured as described above, the drive unit 32 turns on the transfer transistor 62 by the control signal OFGn and supplies the photocurrent due to the charge generated in the photoelectric conversion element 61 of the pixel 51 to the event detection unit 52. As a result, the event detection unit 52 is supplied with the current of the sum of the photocurrents of all the pixels 51 in the pixel block 41.

In the pixel block 41, when the event detection unit 52 detects the change in (the sum of) the photocurrent as an event, the drive unit 32 turns off the transfer transistors 62 of all the pixels 51 of the pixel block 41 and stops the supply of the photocurrent to the event detection unit 52. Then, after detecting the event, the drive unit 32 selects the row of the pixels 51 by the control signal (selection signal) SEL, then resets the photoelectric conversion element 61, and starts exposure. After the exposure is completed, the drive unit 32 sequentially turns on the transfer transistor 63 of the pixel 51 in the pixel block 41 in which the event is detected by the control signal TRGn, and transfers the charge generated by the photoelectric conversion element 61 to the FD 74. In the FD 74, the charge transferred from (the photoelectric conversion element 61 of) the pixel 51 is accumulated. The voltage corresponding to the charge accumulated in the FD 74 is output to the VSL as a pixel signal of the pixel 51 via the amplification transistor 72 and the selection transistor 73.

As described above, in the DVS 13 (FIG. 2), the pixel signals of the pixels 51 of only the pixel block 41 in which the event has been detected are sequentially output to the VSL. The pixel signal output to the VSL is supplied to the AD conversion unit 34 and subjected to AD conversion.

Here, for each pixel 51 in the pixel block 41, the transfer transistors 63 can be simultaneously turned on instead of being sequentially turned on. In this case, the sum of the pixel signals of all the pixels 51 in the pixel block 41 can be output, and binning can be implemented.

In the pixel array unit 31 of FIG. 3, in a case where the pixel block 41 includes a plurality of pixels 51, the event detection unit 52 and the pixel signal generation unit 53 are shared by the plurality of pixels 51. As a result, as compared with a case where one event detection unit 52 and one pixel signal generation unit 53 are provided for one pixel 51, the number of event detection units 52 and pixel signal generation units 53 can be reduced, and the scale of the pixel array unit 31 can be suppressed.

The pixel block 41 can include one pixel 51 instead of a plurality of pixels 51.

In the pixel block 41, the event detection unit 52 can be provided for each pixel 51. In a case where the event detection unit 52 is shared by the plurality of pixels 51 of the pixel block 41, the event is detected in units of the pixel blocks 41. However, in a case where the event detection unit 52 is provided for each pixel 51, the event can be detected in units of the pixels 51.

In a case where it is not necessary to output a pixel signal, the pixel block 41 can be configured without providing the pixel signal generation unit 53. In a case where the pixel block 41 is configured without the pixel signal generation unit 53, the DVS 13 can be configured without the AD conversion unit 34 and the transfer transistor 63. In this case, the scale of the pixel array unit 31 can be suppressed.

<Configuration Example of Event Detection Unit 52>

Figure 5:
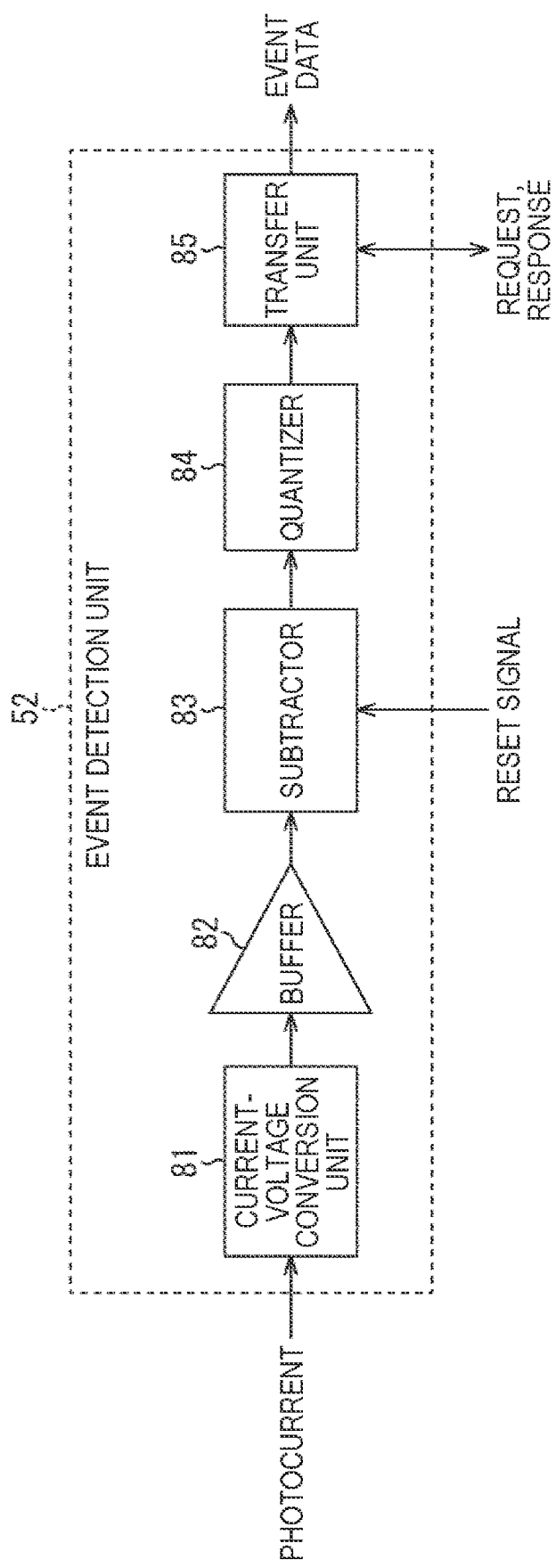
FIG. 5 is a block diagram illustrating a configuration example of an event detection unit 52.

FIG. 5 is a block diagram illustrating a configuration example of the event detection unit 52 in FIG. 3.

The event detection unit 52 includes a current-voltage conversion unit 81, a buffer 82, a subtractor 83, a quantizer 84, and a transfer unit 85.

The current-voltage conversion unit 81 converts (the sum of) the photocurrent from the pixel 51 into a voltage (hereinafter, also referred to as a photovoltage) corresponding to the logarithm of the photocurrent, and supplies the voltage to the buffer 82.

The buffer 82 buffers the photovoltage from the current-voltage conversion unit 81 and supplies the photovoltage to the subtractor 83.

The subtractor 83 calculates a difference between the current photovoltage and a photovoltage at a timing different from the current timing by a minute time, and supplies a difference signal corresponding to the difference to the quantizer 84.

The quantizer 84 quantizes the difference signal from the subtractor 83 into a digital signal and supplies a quantized value of the difference signal to the transfer unit 85.

The transfer unit 85 transfers (outputs) the event data to the drive unit 32 and the output unit 35 according to the quantized value of the difference signal from the quantizer 84. That is, the transfer unit 85 supplies a request for requesting the output of the event data to the arbiter 33. Then, upon receiving a response indicating that the output of the event data is permitted in response to the request from the arbiter 33, the transfer unit 85 outputs the event data to the drive unit 32 and the output unit 35.

<Configuration Example of Current-Voltage Conversion Unit 81>

Figure 6:
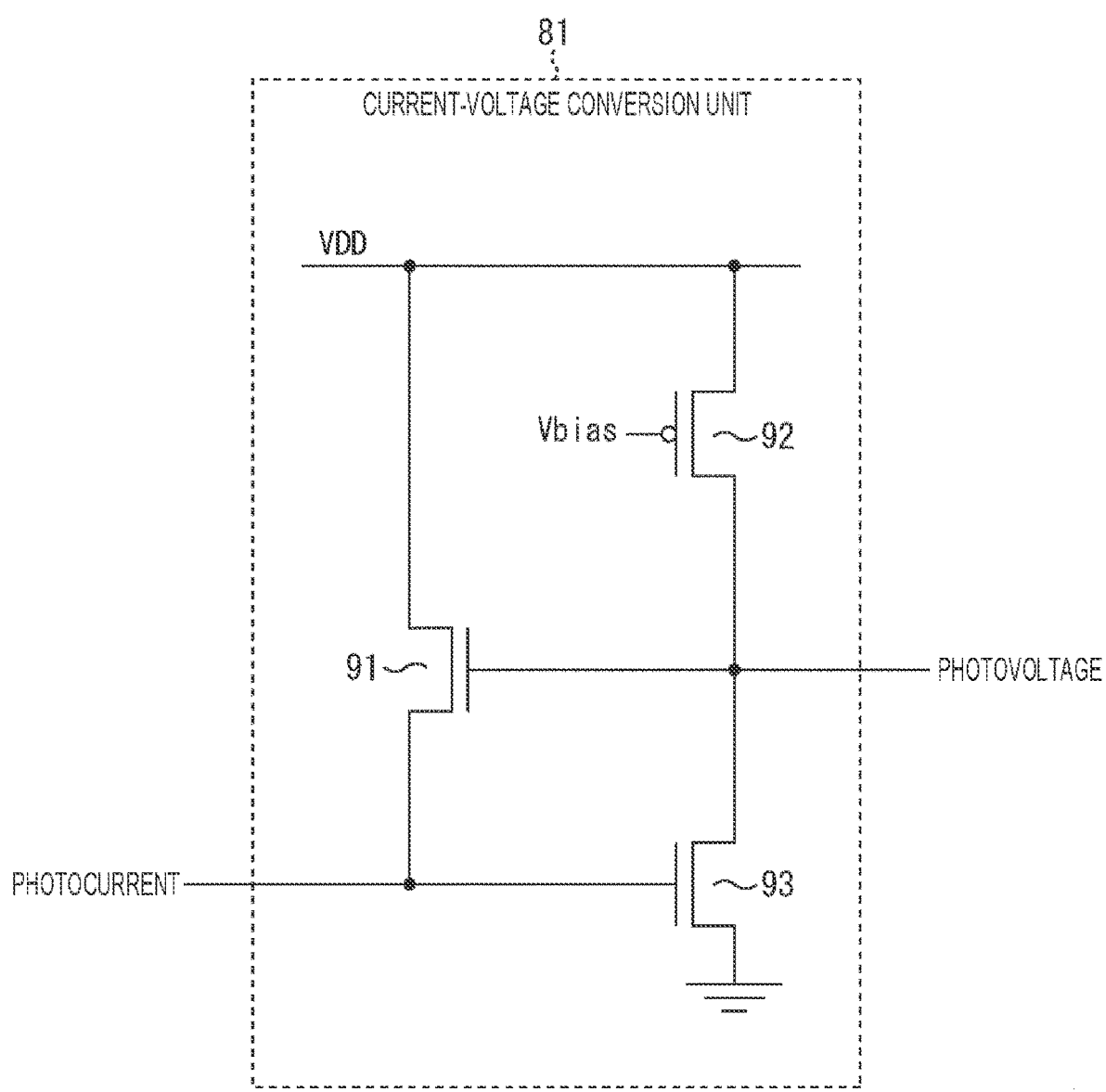
FIG. 6 is a circuit diagram illustrating a configuration example of a current-voltage conversion unit 81.

FIG. 6 is a circuit diagram illustrating a configuration example of the current-voltage conversion unit 81 in FIG. 5.

The current-voltage conversion unit 81 includes FETs 91 to 93. An N-type MOS FET can be adopted as the FETs 91 and 93, for example, and a P-type MOS (PMOS) FET can be adopted as the FET 92, for example.

The source of the FET 91 is connected to the gate of the FET 93, and a photocurrent from the pixel 51 is supplied to a connection point between the source of the FET 91 and the gate of the FET 93. The drain of the FET 91 is connected to the power supply VDD, and the gate thereof is connected to the drain of the FET 93.

The source of the FET 92 is connected to the power supply VDD, and the drain thereof is connected to a connection point between the gate of the FET 91 and the drain of the FET 93. A predetermined bias voltage Vbias is applied to the gate of the FET 92.

The source of the FET 93 is grounded.

In the current-voltage conversion unit 81, the drain of the FET 91 is connected to the power supply VDD side whereby a source follower is formed. The pixel 51 (FIG. 4) is connected to the source of the FET 91 that is the source follower, and accordingly, a photocurrent due to the charge generated in the photoelectric conversion element 61 of the pixel 51 flows through (from the drain to the source of) the FET 91. The FET 91 operates in the subthreshold region, and a photovoltage corresponding to the logarithm of the photocurrent flowing through the FET 91 appears at the gate of the FET 91. As described above, in the current-voltage conversion unit 81, the photocurrent from the pixel 51 is converted into the photovoltage corresponding to the logarithm of the photocurrent by the FET 91.

The photovoltage is supplied to the buffer 82 (FIG. 5) from a connection point between the gate of the FET 91 and the drain of the FET 93.

<Configuration Examples of Subtractor 83 and Quantizer 84>

Figure 7:
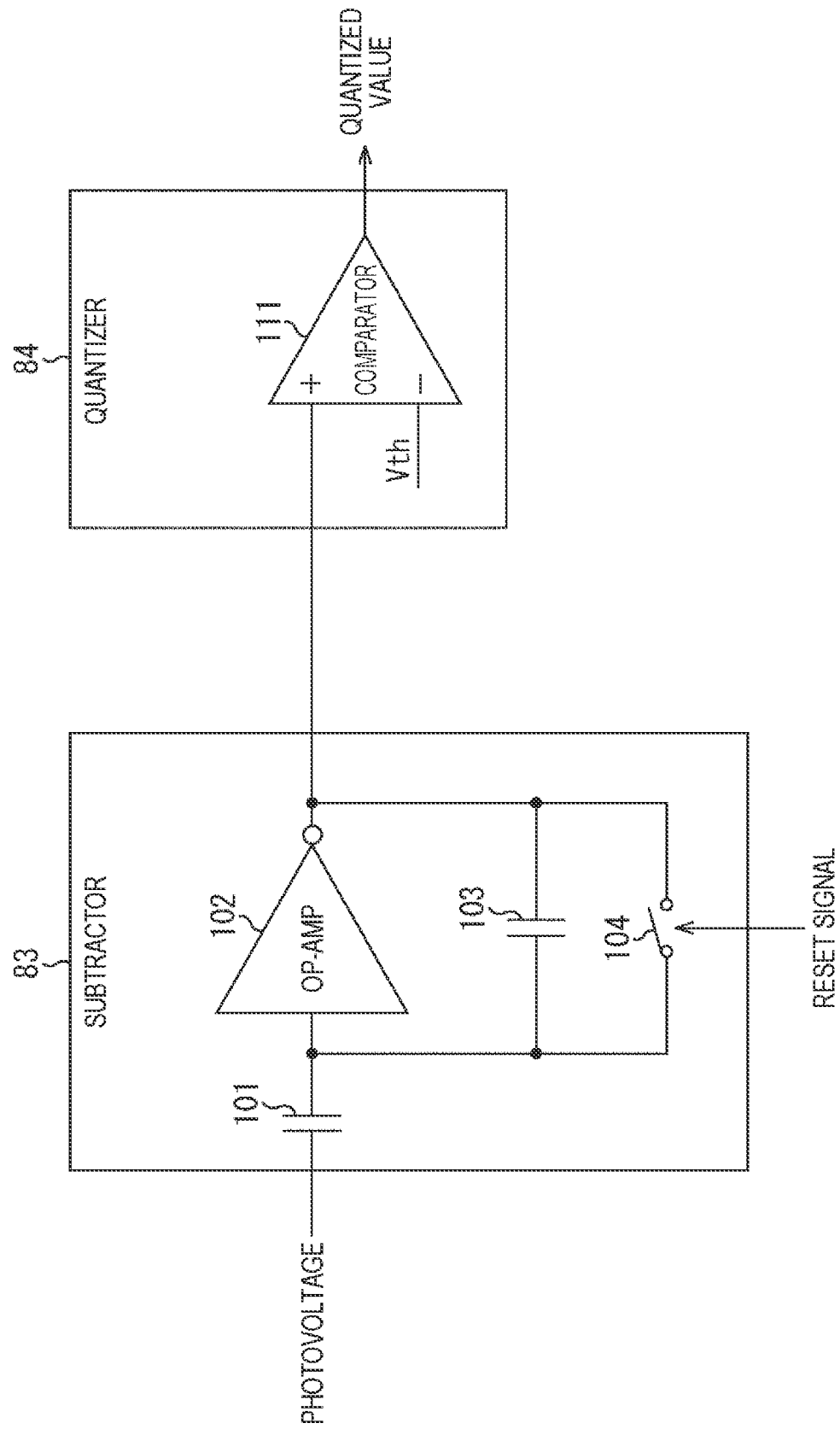
FIG. 7 is a circuit diagram illustrating a configuration example of a subtractor 83 and a quantizer 84.

FIG. 7 is a circuit diagram illustrating a configuration example of the subtractor 83 and the quantizer 84 of FIG. 5.

The subtractor 83 includes a capacitor 101, an operational amplifier 102, a capacitor 103, and a switch 104. The quantizer 84 includes a comparator 111.

One end of the capacitor (capacitance) 101 is connected to the output terminal of the buffer 82 (FIG. 5), and the other end is connected to the (inverted) input terminal of the operational amplifier 102. Therefore, the photovoltage is input to the input terminal of the operational amplifier 102 via the capacitor 101.

An output terminal of the operational amplifier 102 is connected to a non-inverting input terminal (+) of the comparator 111.

One end of the capacitor 103 is connected to an input terminal of the operational amplifier 102, and the other end is connected to an output terminal of the operational amplifier 102.

The switch 104 is connected to the capacitor 103 so as to turn on/off the connection between both ends of the capacitor 103. The switch 104 is turned on/off after an event is detected or the like according to the reset signal from the arbiter 33, thereby turning on/off the connection between both ends of the capacitor 103. The capacitor 103 and the switch 104 constitute a switched capacitor.

The photovoltage on the buffer 82 (FIG. 5) side of the capacitor 101 when the switch 104 is turned on is denoted by Vinit, and the capacitance (electrostatic capacitance) of the capacitor 101 is denoted by C1. The input terminal of the operational amplifier 102 is virtually grounded, and the charge Qinit accumulated in the capacitor 101 when the switch 104 is turned on is expressed by Formula (1).

$$Q\text{init} = C1 \times V\text{init} \tag{1}$$

Since both ends of the capacitor 103 are short-circuited when the switch 104 is on, the charge accumulated in the capacitor 103 becomes zero.

Thereafter, when the photovoltage on the buffer 82 (FIG. 5) side of the capacitor 101 in a case where the switch 104 is turned off is represented as Vafter, the charge Qafter accumulated in the capacitor 101 in a case where the switch 104 is turned off is represented by Formula (2).

$$Q\text{after} = C1 \times V\text{after} \tag{2}$$

When the capacitance of the capacitor 103 is represented as C2 and the output voltage of the operational amplifier 102 is represented as Vout, the charge Q2 accumulated in the capacitor 103 is represented by Formula (3).

$$Q2 = -C2 \times V\text{out} \tag{3}$$

Before and after the switch 104 is turned off, the total charge amount of the charge of the capacitor 101 and the charge of the capacitor 103 does not change, so that Formula (4) is established.

$$Q\text{init} = Q\text{after} + Q2 \tag{4}$$

When Formulas (1) to (3) are substituted into Formula (4), Formula (5) is obtained.

$$V\text{out} = -(C1/C2) \times (V\text{after} - V\text{init}) \tag{5}$$

According to Formula (5), the subtractor 83 performs subtraction of the photovoltages Vafter and Vinit, that is, calculates the difference signal Vout corresponding to the difference between Vafter-Vinit the photovoltages Vafter and Vinit. According to Formula (5), the gain of subtraction by the subtractor 83 is C1/C2. Generally, it is desired to maximize the gain, and thus, it is preferable to design C1 to be large and C2 to be small. On the other hand, if C2 is too small, kTC noise increases, and noise characteristics may deteriorate. Therefore, capacity reduction of C2 is limited to a range in which noise can be tolerated. Furthermore, since the event detection unit 52 including the subtractor 83 is mounted for each pixel block 41, the capacitances C1 and C2 have area restrictions. In consideration of these, the values of the capacitances C1 and C2 are determined.

The comparator 111 compares the difference signal from the subtractor 83 with a predetermined threshold (voltage) Vth applied to the inverting input terminal (−). The comparator 111 outputs, for example, a high (H) level or a low (L) level representing the comparison result between the difference signal and the threshold Vth to the transfer unit 85 as the quantized value of the difference signal.

In a case where it is recognized that a light amount change as an event has occurred according to the quantized value of the difference signal from the quantizer 84, that is, in a case where the difference signal (Vout) is larger (or smaller) than the threshold Vth, the transfer unit 85 outputs event data (for example, the H level) representing the occurrence of the event to the output unit 35. For example, the transfer unit 85 outputs the quantized value of the difference signal from the quantizer 84 to the output unit 35 as event data.

The output unit 35 outputs the event data from the transfer unit 85 by including therein the position information of (the pixel block 41 including) the pixel 51 in which the event represented by the event data has occurred, the time information representing the time at which the event has occurred, and as necessary, the polarity of the light amount change as the event.

A data format called an address event representation (AER) can be adopted as a data format of the event data including the position information of the pixel 51 in which the event has occurred, the time information representing the time when the event has occurred, and the polarity of the light amount change as the event, for example.

The gain A of the entire event detection unit 52 is expressed by the following equation, where the gain of the current-voltage conversion unit 81 is represented by $CG_{log}$, the gain of the buffer 82 is represented by 1, and the gain of the quantizer 84 is represented by G.

$$A = CG_{log} C1/C2 G(\Sigma i_{photo\_n}) \quad (6)$$

$i_{photo\_n}$ represents the photocurrent of the n-th pixel 51 among the I×J pixels 51 constituting the pixel block 41. Σ in Formula (6) represents a summation obtained by changing n to an integer from 1 to I×J.

In the pixel 51, arbitrary light can be received as the incident light by providing an optical filter that transmits predetermined light such as a color filter. For example, in a case where visible light is received as incident light in the pixel 51, the event data represents the occurrence of a change in a pixel value in an image in which a visible subject appears. Furthermore, for example, in a case where the pixel 51 receives infrared rays, millimeter waves, or the like for distance measurement as incident light, the event data represents the occurrence of a change in the distance to the subject. Furthermore, for example, in a case where infrared rays for measuring the temperature are received as incident light in the pixel 51, the event data represents the occurrence of a change in the temperature of the subject. In the present embodiment, the pixel 51 receives visible light as incident light.

In the DVS 13 (FIG. 2) configured as described above, the drive unit 32 changes all the control signals OFGn from the L level to the H level, and turns on the transfer transistors 62 of all the pixels 51 in the pixel block 41. As a result, the sum of the photocurrents of all the pixels 51 in the pixel block 41 is supplied to the event detection unit 52. At this time, all the control signals TRGn are at the L level, and the transfer transistors 63 of all the pixels 51 are turned off.

The event detection unit 52 detects a change in the photocurrent exceeding a predetermined threshold as an event, and outputs H-level event data in response to the detection of the event.

The drive unit 32 sets all the control signals OFGn to the L level according to the event data to the H level, and stops the supply of the photocurrent from the pixel 51 to the event detection unit 52. Furthermore, the drive unit 32 resets the pixel 51 by setting the control signal SEL to the H level, setting the control signal RST and the control signal TRGn to the H level for a certain period, and discharging the charge of the photoelectric conversion element 61 to the power supply VDD. Thereafter, the drive unit 32 waits for the exposure time, sets the control signal RST to the H level, and resets the FD 74. The pixel signal generation unit 53 outputs a pixel signal corresponding to the voltage of the FD 74 at the time of resetting the FD 74 as a reset level, and the AD conversion unit 34 performs AD conversion on the reset level.

After the AD conversion of the reset level, the drive unit 32 sets the control signal TRG1 to the H level for a certain period, and transfers the charge generated by the photoelectric conversion of (the photoelectric conversion element 61 of) the first pixel 51 in the pixel block 41 in which the event has been detected to the FD 74. The pixel signal generation unit 53 outputs a pixel signal corresponding to the voltage of the FD 74 to which the charge has been transferred from the pixel 51 as a signal level, and the AD conversion unit 34 performs AD conversion on the signal level.

The AD conversion unit 34 outputs the difference between the signal level after the AD conversion and the reset level to the output unit 35 as a pixel signal serving as a pixel value of an image (frame data).

Here, processing of obtaining the difference between the signal level and the reset level as a pixel signal serving as a pixel value of an image is referred to as CDS. In addition to performing CDS after AD conversion of the signal level and the reset level, in a case where single-slope AD conversion is performed by the AD conversion unit 34, it is possible to perform CDS simultaneously with AD conversion of the signal level and the reset level by performing AD conversion of the signal level with the AD conversion result of the reset level as an initial value.

After AD conversion of the pixel signal of the first pixel 51 in the pixel block 41, the drive unit 32 sets the control signal TRG2 to the H level for a certain period of time, thereby outputting the pixel signal of the second pixel 51 in the pixel block 41 in which the event has been detected.

In the DVS 13, a similar operation is performed hereinafter, and the pixel signals of the respective pixels 51 in the pixel block 41 in which the event is detected are sequentially output.

When the pixel signal of the pixel 51 in the pixel block 41 is output, the drive unit 32 sets the control signal OFGn to the H level to turn on the transfer transistor 62 of the pixel 51 in the pixel block 41, and thereafter, the similar operation is repeated.

Hereinafter, the DVS 13 does not output the pixel signal but outputs the event data.

<Generation of Frame Data according to Event Data>

Figure 8:
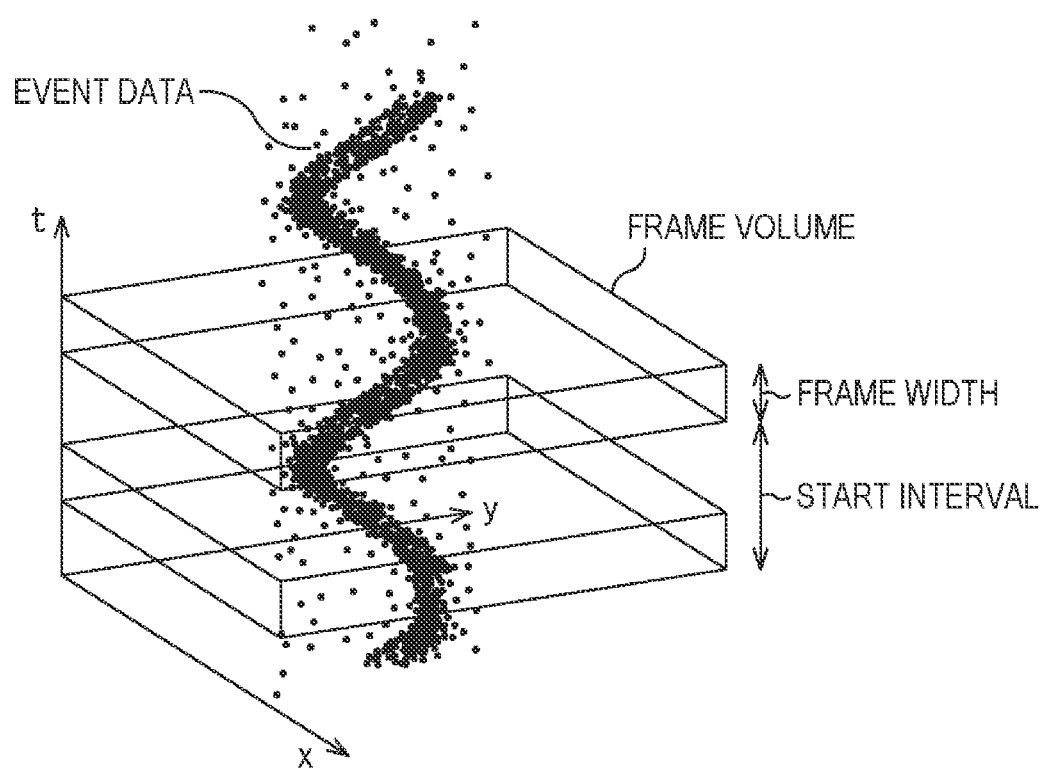
FIG. 8 is a diagram illustrating an example of a method of generating frame data according to event data.

FIG. 8 is a diagram illustrating an example of a method of generating frame data according to event data.

For example, the data processing unit 14 sets the start interval and the frame width according to the control of the control unit 12. Here, the start interval represents an interval of a timing at which generation of frame data of one frame is started. The frame width represents the time from the start of frame generation to the end of frame generation of frame data of one frame. The start interval and the frame width set by the data processing unit 14 are also referred to as a setting start interval and a setting frame width, respectively.

The data processing unit 14 converts the event data into frame data by generating frame data according to the setting start interval and the setting frame width, and the event data from the DVS 13.

That is, the data processing unit 14 generates frame data according to the event data within the set frame width from the head of the setting start interval for each setting start interval. As a result, frame data is generated at frame intervals controlled according to the preset start interval and the preset frame width.

Now, it is assumed that the event data includes time information (hereinafter, also referred to as a time of an event) t indicating the time at which the event has occurred and coordinates (x, y) as position information (hereinafter, also referred to as a position of an event) of (the pixel block 41 including) the pixel 51 in which the event has occurred.

In FIG. 8, in a three-dimensional (time) space constituted by an x axis, a y axis, and a time axis t, points as event data are plotted at the time t of an event included in the event data and the position of the event (coordinates as the event) (x, y).

That is, assuming that the time t of the event included in the event data and the position (x, y, t) in the three-dimensional space represented by the position (x, y) of the event are referred to as the spatiotemporal position of the event, in FIG. 8, the event data is plotted as a point at the spatiotemporal position (x, y, t) of the event.

For example, the data processing unit 14 sets the time according to the control of the control unit 12 as the generation start time for starting the generation of the frame data, and starts the generation of the frame data according to the event data.

Now, a rectangular parallelepiped having a thickness (height) of a set frame width in the time axis t direction for each setting start interval from the generation start time is referred to as a frame volume. The sizes of the frame volume in the x-axis direction and the y-axis direction are equal to, for example, the number of pixel blocks 41 or pixels 51 in the x-axis direction and the number of pixels in the y-axis direction, respectively.

The data processing unit 14 generates frame data of one frame for each setting start interval according to the event data (using the event data) in the frame volume of the setting frame width from the head of the setting start interval.

The generation of the frame data can be performed, for example, by setting (the pixel value of) the pixel of the frame at the position (x, y) of the event included in the event data to white and setting the pixel at another position of the frame to a predetermined color such as gray.

In addition, in a case where the event data includes the polarity of the light amount change as the event, the frame data can be generated in consideration of the polarity included in the event data. For example, in a case where the polarity is positive, the pixel can be set to white, and in a case where the polarity is negative, the pixel can be set to black.

Furthermore, as described with reference to FIGS. 3 and 4, in a case where the pixel array unit 31 outputs the event data and outputs the pixel signal of the pixel 51, the frame data can be generated using the pixel signal of the pixel 51 according to the event data. That is, regarding the frame, the frame data can be generated by setting the pixel signal of the pixel 51 at the position (x, y) as the pixel value of the pixel at the position (x, y) of the event included in the event data and setting the pixel at another position to a predetermined color such as gray.

In the frame volume, there may be a plurality of pieces of event data having the same event position (x, y) although the time t of the event is different. In this case, for example, the event data having the latest or oldest time t of the event can be prioritized. Furthermore, in a case where the event data includes polarity, the polarities of a plurality of pieces of event data having the same event position (x, y) are added together although the time t of the event is different, and a pixel value corresponding to the addition value obtained by the addition can be set in the pixel at the event position (x, y).

Here, in a case where the frame width and the start interval are the same, the frame volume is in a state of being in contact without a gap. In addition, in a case where the start interval is larger than the frame width, the frame volumes are arranged with a gap. When the frame width is larger than the start interval, the frame volumes are arranged in a partially overlapping manner.

<Configuration Example of Data Processing Unit 14>

Figure 9:
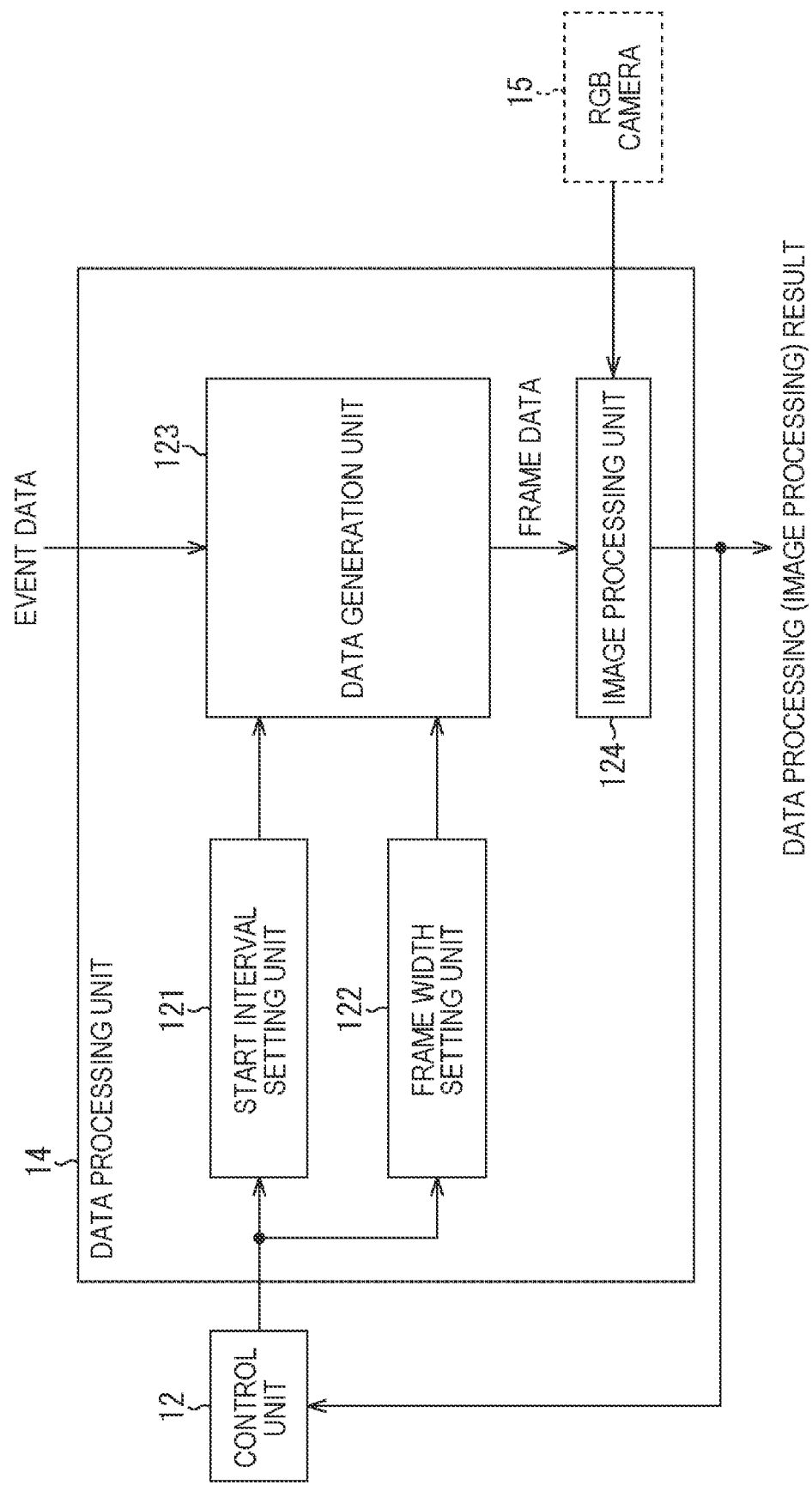
FIG. 9 is a block diagram illustrating a configuration example of a data processing unit 14.

FIG. 9 is a block diagram illustrating a configuration example of the data processing unit 14 in FIG. 1.

In FIG. 9, the data processing unit 14 includes a start interval setting unit 121, a frame width setting unit 122, a data generation unit 123, and an image processing unit 124.

For example, the start interval setting unit 121 sets a start interval according to the control of the control unit 12 and supplies the start interval to the data generation unit 123. The start interval can be specified and set by time or the number of pieces of event data. Here, the start interval set by the start interval setting unit 121 is also referred to as a setting start interval.

For example, the frame width setting unit 122 sets the frame width under the control of the control unit 12 and supplies the frame width to the data generation unit 123. Similarly to the start interval, the frame width can be specified and set by the time or the number of pieces of event data. Here, the frame width set by the frame width setting unit 122 is also referred to as a set frame width.

The data generation unit 123 converts the event data into frame data and supplies the frame data to the image processing unit 124 by generating frame data which is image data in a frame format according to the event data output from the DVS 13.

The data generation unit 123 generates frame data of a frame interval (frame rate) controlled by the setting start interval and the setting frame width according to the setting start interval from the start interval setting unit 121 and the setting frame width from the frame width setting unit 122.

That is, the data generation unit 123 generates the frame data according to the event data within the set frame width from the head of the setting start interval for each setting start interval. As a result, frame data is generated at frame intervals controlled according to the preset start interval and the preset frame width. For example, by setting the setting start interval to a small value or a large value, frame data having a short or long frame interval can be generated. Furthermore, by setting the setting frame width to decrease or increase, it is possible to generate frame data of a short or long frame interval.

The image processing unit 124 performs image processing using the frame data supplied from the data generation unit 123, and outputs a processing result (image processing result) of the image processing as a data processing result. For example, the image processing unit 124 performs object recognition on the frame data supplied from the data generation unit 123, and outputs the object recognition result. The object recognition result output from the image processing unit 124 is supplied to the control unit 12.

In addition, a predetermined value can be adopted for either the start interval or the frame width. In a case where a predetermined value is adopted as the start interval, the data processing unit 14 can be configured without providing the start interval setting unit 121. Similarly, in a case where a predetermined value is adopted as the frame width, the data processing unit 14 can be configured without the frame width setting unit 122.

<Processing of Sensor Module>

Figure 10:
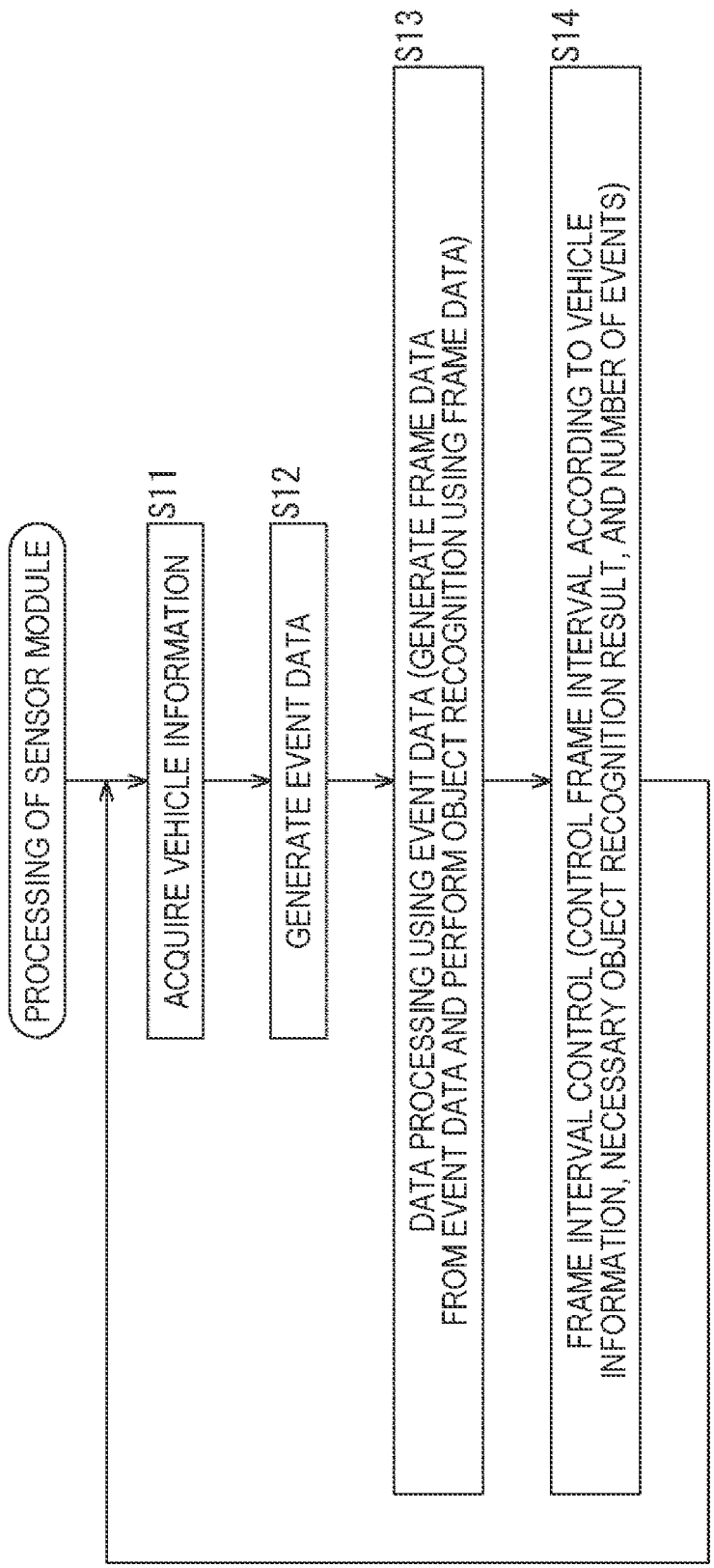
FIG. 10 is a flowchart illustrating an example of processing of a sensor module.

FIG. 10 is a flowchart illustrating an example of processing of the sensor module of FIG. 1.

In step S11, the vehicle information acquisition unit 11 acquires vehicle information from the host vehicle and supplies the vehicle information to the control unit 12, and the process proceeds to step S12.

In step S12, when a change in the electrical signal of the pixel 51 occurs as an event, the DVS 13 generates event data and supplies the event data to the control unit 12 and the data processing unit 14, and the process proceeds to step S13.

In step S13, the data processing unit 14 performs data processing using the event data from the DVS 13, and the process proceeds to step S14. As the data processing using the event data, for example, processing of generating frame data from the event data, object recognition using (targeted for) the frame data, and the like are performed. The recognition result (object recognition result) of the object recognition is supplied from the data processing unit 14 to the control unit 12.

In step S14, the control unit 12 performs frame interval control for controlling the frame interval of the frame data generated from the event data by the data processing unit 14, and the processing returns to step S11. Here, the frame interval control is also frame rate control for controlling the frame rate of the frame data.

In the frame interval control, for example, the frame interval is controlled according to the vehicle information supplied from the vehicle information acquisition unit 11 to the control unit 12. Furthermore, in the frame interval control, the frame interval can be controlled according to the number of events per unit time specified from the event data supplied from the DVS 13 to the control unit 12, the object recognition result supplied from the data processing unit 14, and the like as necessary. The frame interval is controlled by setting (controlling) a start interval and a frame width.

Here, in driving assistance or the like of the host vehicle on which the sensor module of FIG. 1 is mounted, in order to obtain detailed information in the time direction regarding an object (subject) having a high relative speed with respect to the host vehicle, it is possible to set a short frame interval and generate frame data of a high frame rate.

However, in a case where the frame interval is set to be always short, the frequency at which the frame data is generated from the event data increases, and the power consumption of the sensor module increases.

For example, when the host vehicle is traveling at a vehicle speed of a certain level or more, frame data of a high frame rate is required, but when the host vehicle is stationary, frame data of a high frame rate may not be required.

Therefore, in the sensor module of FIG. 1, the control unit 12 performs the frame interval control for controlling the frame interval according to the vehicle information or the like, whereby the frequency at which the frame data is generated from the event data is adjusted, and the power consumption is suppressed.

<First Example of Frame Interval Control>

Figure 11:
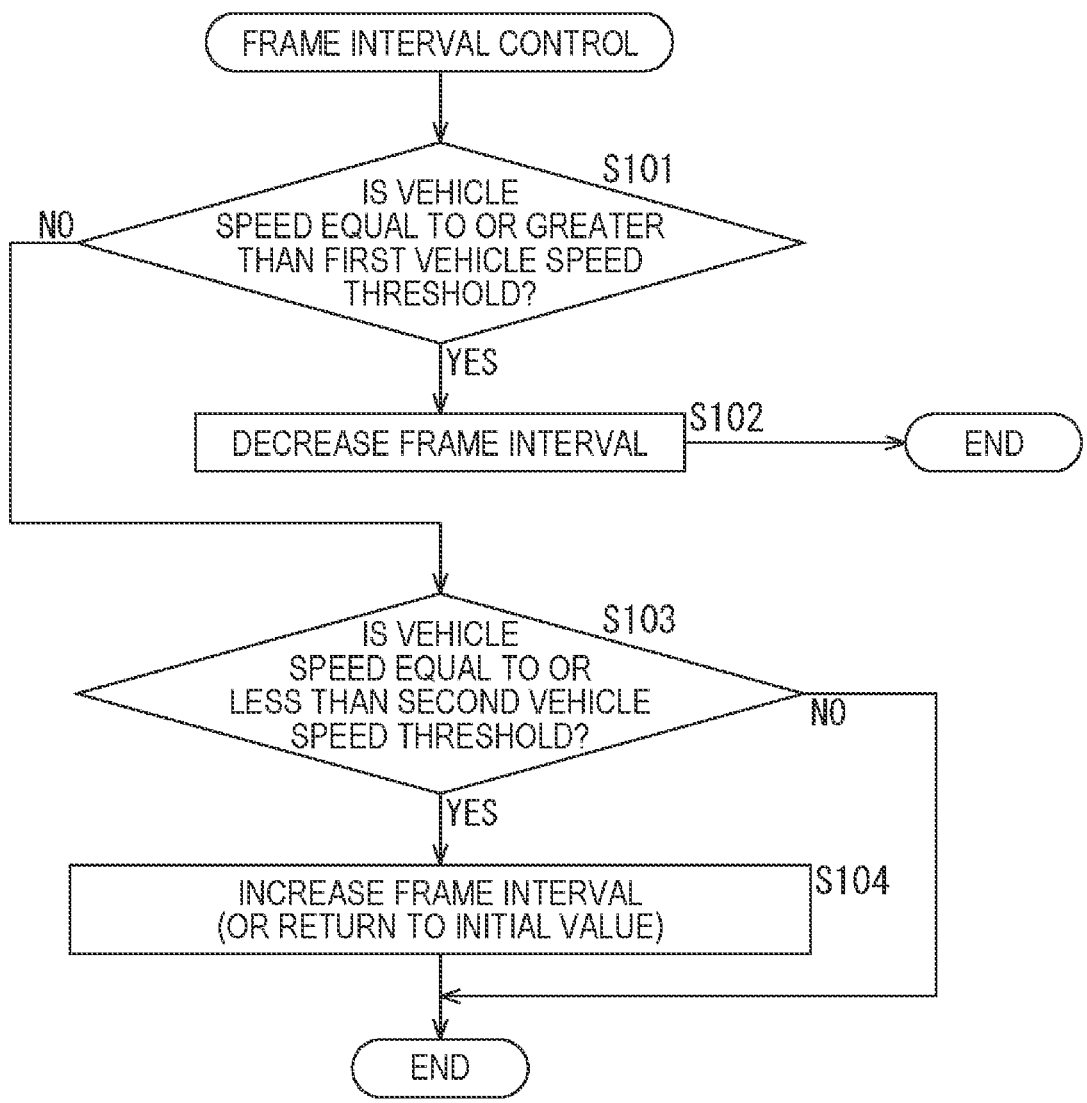
FIG. 11 is a flowchart for explaining a first example of the frame interval control in step S14.

FIG. 11 is a flowchart illustrating a first example of the frame interval control in step S14 of FIG. 10.

In the first example of the frame interval control, the frame interval is controlled according to the vehicle speed of the host vehicle included in the vehicle information.

In step S101, the control unit 12 determines whether the vehicle speed is equal to or greater than a first vehicle speed threshold, and in a case where it is determined that the vehicle speed is equal to or greater than the first vehicle speed threshold, the process proceeds to step S102.

In step S102, the control unit 12 controls the frame interval so that the frame interval is shorter than the current value, and the process ends. Therefore, in a case where the host vehicle is traveling at a high speed on an expressway or the like, for example, frame data of a high frame rate is generated.

When it is determined in step S101 that the vehicle speed is not equal to or greater than the first vehicle speed threshold, the process proceeds to step S103.

In step S103, the control unit 12 determines whether the vehicle speed is equal to or less than the second vehicle speed threshold, and in a case where it is determined that the vehicle speed is equal to or less than the second vehicle speed threshold, the process proceeds to step S104.

In step S104, the control unit 12 controls the frame interval so that the frame interval is longer than the current value or returns to the initial value (default value), and the process ends. Therefore, for example, when the host vehicle is traveling at a low speed or is stopped, the frame rate of the frame data decreases. In this case, since the frequency of generation of frame data decreases, power consumption can be suppressed.

A value equal to or greater than the second vehicle speed threshold can be adopted as the first vehicle speed threshold (a value equal to or less than the first vehicle speed threshold can be adopted as the second vehicle speed threshold). In addition, the maximum value of the frame interval can be limited to an initial value. The minimum value of the frame interval can be limited to a predetermined value.

<Second Example of Frame Interval Control>

Figure 12:
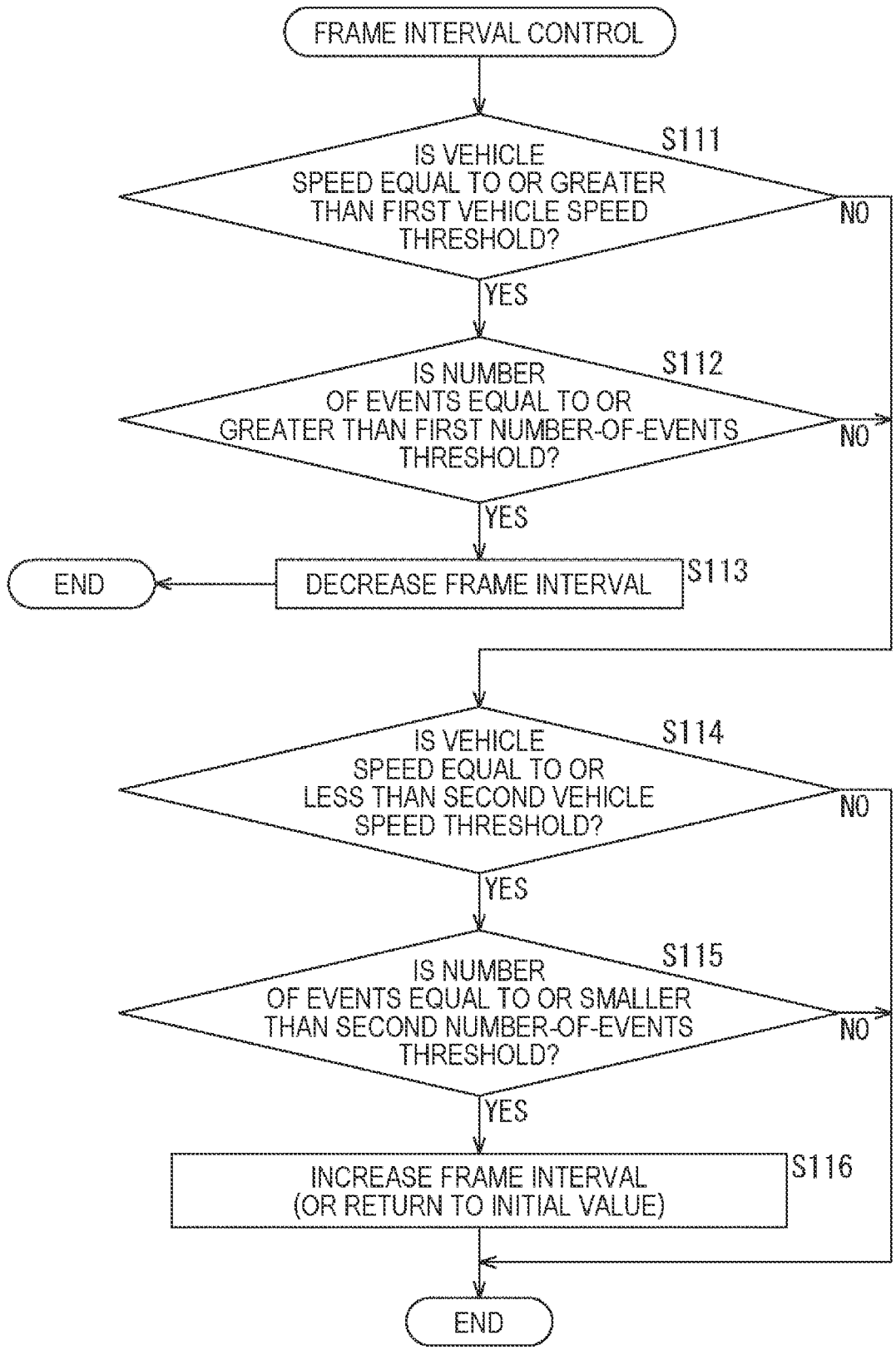
FIG. 12 is a flowchart illustrating a second example of the frame interval control in step S14.

FIG. 12 is a flowchart illustrating a second example of the frame interval control in step S14 of FIG. 10.

In the second example of the frame interval control, the frame interval is controlled according to the number of events per unit time in addition to the vehicle speed of the host vehicle included in the vehicle information.

In step S111, the control unit 12 determines whether the vehicle speed is equal to or greater than the first vehicle speed threshold, and in a case where it is determined that the vehicle speed is equal to or greater than the first vehicle speed threshold, the process proceeds to step S112.

In step S112, the control unit 12 determines whether the number of events per unit time is equal to or greater than the first number-of-events threshold, and in a case where it is determined that the number of events per unit time is equal to or greater than the first number-of-events threshold, the process proceeds to step S113.

In step S113, the control unit 12 controls the frame interval so that the frame interval is shorter than the current value, and the process ends. Therefore, for example, in a case where the host vehicle is traveling at a high speed on an expressway or the like and the detection frequency of an event is high, frame data of a high frame rate is generated.

On the other hand, when it is determined in step S111 that the vehicle speed is not equal to or greater than the first vehicle speed threshold and when it is determined in step S112 that the number of events per unit time is not equal to or greater than the first event count threshold, the process proceeds to step S114.

In step S114, the control unit 12 determines whether the vehicle speed is equal to or less than the second vehicle speed threshold, and in a case where it is determined that the vehicle speed is equal to or less than the second vehicle speed threshold, the process proceeds to step S115.

In step S115, the control unit 12 determines whether the number of events per unit time is equal to or smaller than the second number-of-events threshold, and in a case where it is determined that the number of events per unit time is equal to or smaller than the second number-of-events threshold, the process proceeds to step S116.

In step S116, the control unit 12 controls the frame interval so that the frame interval is longer than the current value or returns to the initial value, and the process ends. Therefore, for example, in a case where the host vehicle is traveling at a low speed or is stopped and the detection frequency of the event is low, the frame rate of the frame data decreases. In this case, power consumption can be suppressed.

A value equal to or greater than the second event count threshold can be adopted as the first event count threshold (a value equal to or less than the first event count threshold may be adopted as the second event count threshold).

In addition, in the frame interval control, the step (step S112) of determining whether the number of events (per unit time) is equal to or greater than the first event count threshold may be performed or may not be performed before the processing (step S113) of controlling the frame interval to be short. The same applies to the determination step (step S115) of determining whether the number of events is equal to or smaller than the second event count threshold before the processing (step S116) of performing control to increase the frame interval or control to return the frame interval to the initial value. The same applies to the frame interval control described below.

<Third Example of Frame Interval Control>

Figure 13:
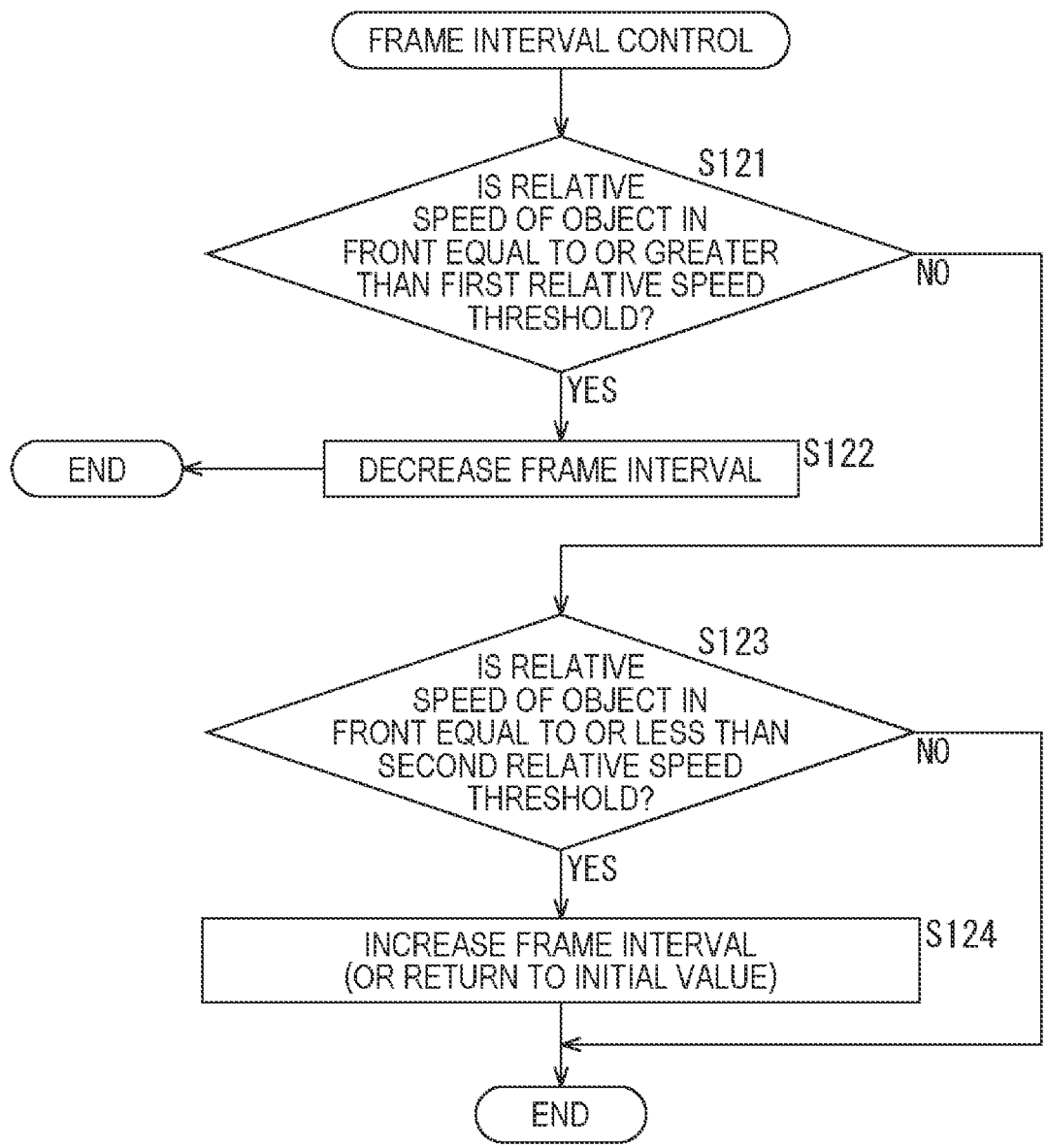
FIG. 13 is a flowchart illustrating a third example of the frame interval control in step S14.

FIG. 13 is a flowchart illustrating a third example of the frame interval control in step S14 of FIG. 10.

In the third example of the frame interval control, the frame interval is controlled according to a relative speed of an object around the host vehicle included in the vehicle information, for example, an object in front of the host vehicle with respect to the host vehicle.

In step S121, the control unit 12 determines whether the relative speed of an object in front of the host vehicle is equal to or greater than a first relative speed threshold, and in a case where it is determined that the relative speed of the object in front of the host vehicle is equal to or greater than the first relative speed threshold, the process proceeds to step S122.

In step S122, the control unit 12 controls the frame interval so that the frame interval is shorter than the current value, and the process ends. Therefore, when the relative speed of the object in front of the host vehicle is high, frame data of a high frame rate is generated.

On the other hand, in a case where it is determined in step S121 that the relative speed of the object in front of the host vehicle is not equal to or greater than the first relative speed threshold, the process proceeds to step S123.

In step S123, the control unit 12 determines whether the relative speed of the object in front of the host vehicle is equal to or less than the second relative speed threshold, and in a case where it is determined that the relative speed of the object in front of the host vehicle is equal to or less than the second relative speed threshold, the process proceeds to step S124.

In step S124, the control unit 12 controls the frame interval so that the frame interval is longer than the current value or returns to the initial value, and the process ends. Therefore, when the relative speed of the object in front of the host vehicle is low, the frame rate of the frame data decreases. In this case, power consumption can be suppressed.

A value equal to or greater than the second relative speed threshold can be adopted as the first relative speed threshold (a value equal to or less than the first relative speed threshold may be adopted as the second relative speed threshold).

Furthermore, as described with reference to FIG. 12, a determination step of determining whether the number of events is equal to or greater than the first event count threshold can be provided before the process of controlling the frame interval to be short (step S122). Similarly, a determination step of determining whether the number of events is equal to or less than the second event number threshold can be provided before the process of performing the control to increase the frame interval or the control to return the frame interval to the initial value (step S124).

Figure 14:
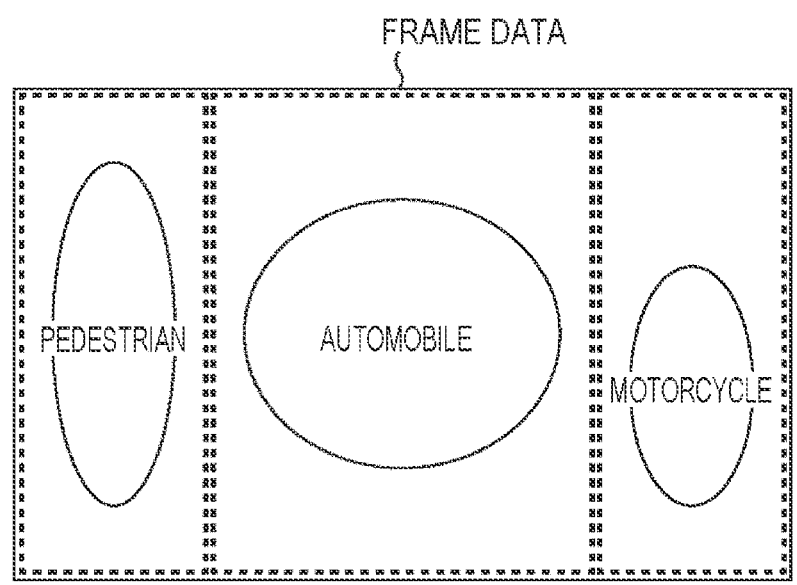
FIG. 14 is a diagram illustrating an example of a determination method of determining a target object of a third example of the frame interval control.

FIG. 14 is a diagram illustrating an example of a determination method of determining a target object of the third example of the frame interval control of FIG. 13.

FIG. 14 schematically illustrates an example of frame data generated from event data. In (the image corresponding to) the frame data of FIG. 14, a pedestrian appears in the left part, an automobile appears in the center part, and a motorcycle appears in the right part. Therefore, three objects of a pedestrian, an automobile, and a motorcycle exist in front of the host vehicle.

The control unit 12 determines, for example, an object having the highest relative speed among the pedestrian, the automobile, and the motorcycle as three objects existing in front of the host vehicle as an object (hereinafter, also referred to as a target object) which is a target of the third example of the frame interval control.

In addition, the control unit 12 can determine, for example, an object specified by the user operating a pointing device such as a cursor as the target object.

<Fourth Example of Frame Interval Control>

Figure 15:
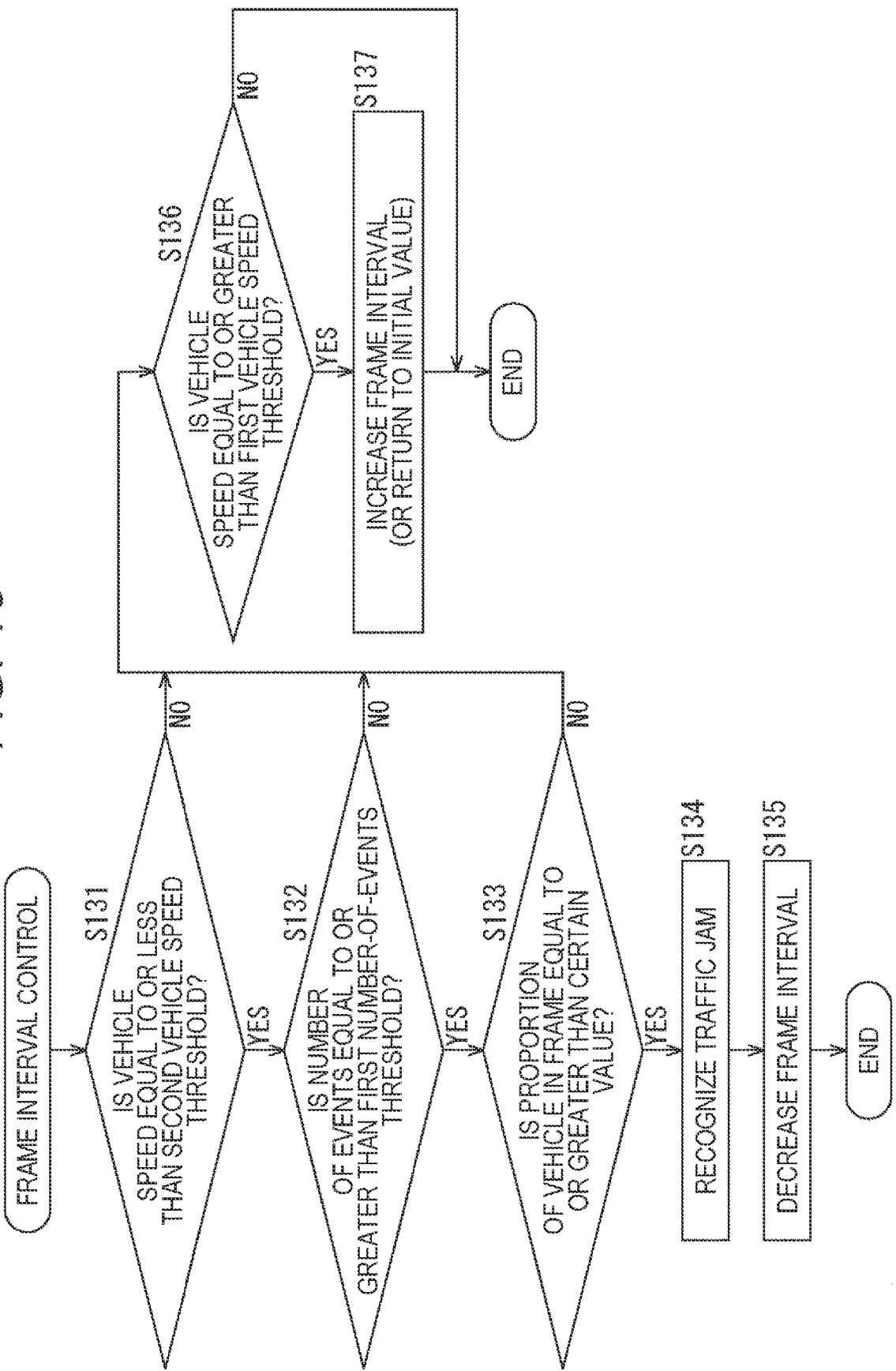
FIG. 15 is a flowchart illustrating a fourth example of the frame interval control in step S14.

FIG. 15 is a flowchart illustrating a fourth example of the frame interval control in step S14 of FIG. 10.

In the fourth example of the frame interval control, the frame interval is controlled according to the number of events per unit time and other vehicles recognized by the object recognition of the data processing unit 14 in addition to the vehicle speed of the host vehicle included in the vehicle information.

In step S131, the control unit 12 determines whether the vehicle speed is equal to or less than the second vehicle speed threshold, and in a case where it is determined that the vehicle speed is equal to or less than the second vehicle speed threshold, the process proceeds to step S132.

In step S132, the control unit 12 determines whether the number of events per unit time is equal to or greater than the first number-of-events threshold, and in a case where it is determined that the number of events per unit time is equal to or greater than the first number-of-events threshold, the process proceeds to step S133.

In step S133, for example, the control unit 12 determines whether the proportion of other vehicles in the frame is equal to or greater than a certain value according to other vehicles recognized by the object recognition of the data processing unit 14 for the frame data generated immediately before.

In a case where it is determined in step S133 that the proportion of other vehicles in the frame is equal to or greater than the certain value, the process proceeds to step S134.

In step S134, the control unit 12 recognizes that there is a traffic jam, and outputs an alarm for alerting the user or the like driving the host vehicle as necessary, and the process proceeds to step S135.

In step S135, the control unit 12 controls the frame interval so that the frame interval is shorter than the current value, and the process ends. Therefore, when the host vehicle frequently repeats, for example, traveling at a low speed and stopping, the detection frequency of the event is high, and another vehicle appears large in the frame, it is recognized that there is a traffic jam, and frame data of a high frame rate is generated in preparation for sudden interruption or the like.

On the other hand, the process proceeds to step S136 in any of a case where it is determined in step S131 that the vehicle speed is not equal to or less than the second vehicle speed threshold, a case where it is determined in step S132 that the number of events per unit time is not equal to or greater than the first event count threshold, and a case where it is determined in step S133 that the proportion of other vehicles in the frame is not equal to or greater than the certain value.

In step S136, the control unit 12 determines whether the vehicle speed is equal to or greater than the first vehicle speed threshold, and in a case where it is determined that the vehicle speed is not equal to or greater than the first vehicle speed threshold, the process ends.

When it is determined in step S136 that the vehicle speed is equal to or greater than the first vehicle speed threshold, the process proceeds to step S137.

In step S137, the control unit 12 controls the frame interval so that the frame interval is longer than the current value or returns to the initial value, and the process ends. Therefore, for example, in a case where a traffic jam is resolved and the host vehicle is traveling at a certain vehicle speed, for example, the frame rate of the frame data decreases. In this case, power consumption can be suppressed.

Figure 16:
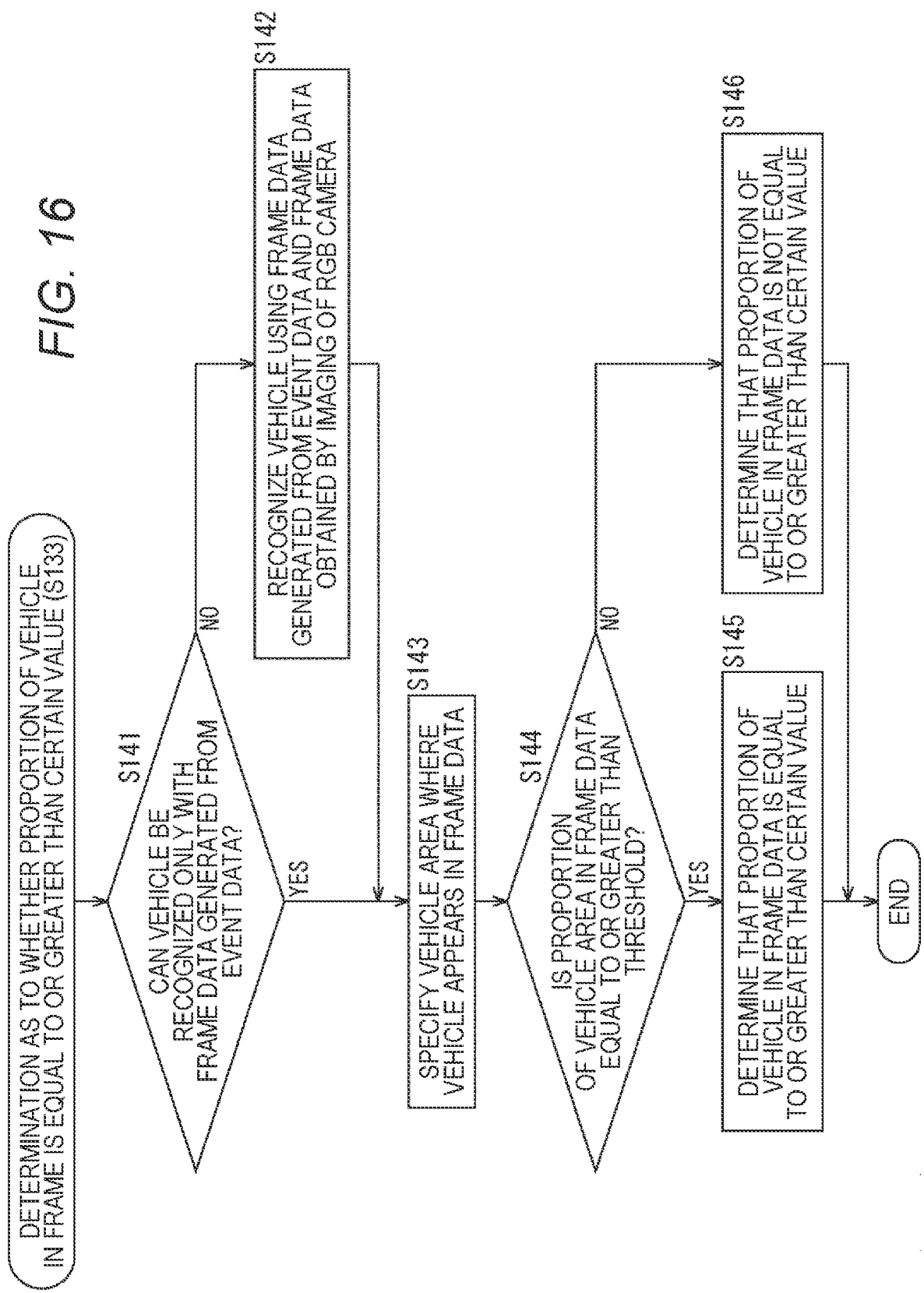
FIG. 16 is a flowchart illustrating details of an example of processing in step S133.

FIG. 16 is a flowchart for describing details of an example of the process of step S133 in FIG. 15 for determining whether the proportion of another vehicle in the frame is equal to or greater than a certain value.

In FIG. 16, it is assumed that the sensor module includes the RGB camera 15.

In step S141, for example, the control unit 12 controls the data processing unit 14 to recognize (other) vehicles only with the frame data generated from the event data as an object, and determines whether the vehicle can be recognized as an object only with the frame data generated from the event data.

In a case where it is determined in step S141 that the vehicle cannot be recognized as an object only with the frame data generated from the event data, the process proceeds to step S142.

In step S142, the control unit 12 controls the data processing unit 14 to recognize vehicles as an object using the frame data generated from the event data and the frame data of a color image obtained by the imaging of the RGB camera 15, and the process proceeds to step S143.

In addition, in a case where it is determined in step S141 that the vehicle can be recognized as an object only with the frame data generated from the event data, the process skips step S142 and proceeds to step S143.

In step S143, the control unit 12 specifies a vehicle area in which another vehicle appears in the frame data from the recognition result (object recognition result) of the object recognition performed by the data processing unit 14, and the process proceeds to step S144.

In step S144, control unit 12 determines whether the proportion of the vehicle area in the frame data is equal to or greater than a predetermined threshold.

In a case where it is determined in step S144 that the proportion of the vehicle area in the frame data is equal to or greater than the predetermined threshold, the process proceeds to step S145.

In step S145, the control unit 12 determines that the proportion of other vehicles in the frame is equal to or greater than the certain value, and the process ends.

In addition, in a case where it is determined in step S144 that the proportion of the vehicle area in the frame data is not equal to or greater than the predetermined threshold, the process proceeds to step S146.

In step S146, the control unit 12 determines that the proportion of other vehicles in the frame is not equal to or greater than the certain value, and the process ends.

Figure 17:
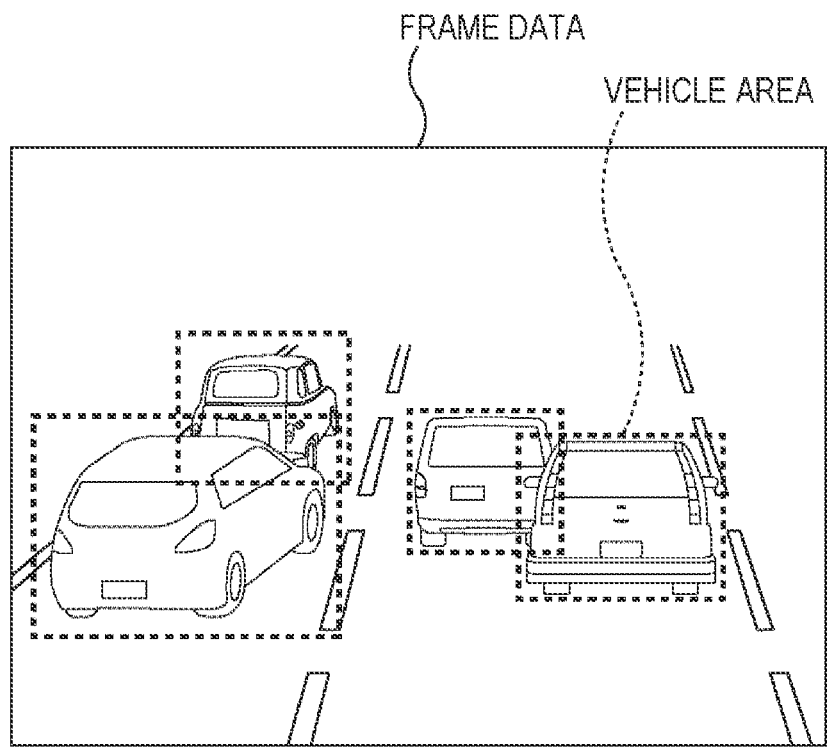
FIG. 17 is a diagram illustrating a specific example of a vehicle area.

FIG. 17 is a diagram illustrating a specific example of the vehicle area.

In the control unit 12, for example, a rectangular area surrounding (other) vehicles appearing in the frame data is specified as the vehicle area.

<Fifth Example of Frame Interval Control>

Figure 18:
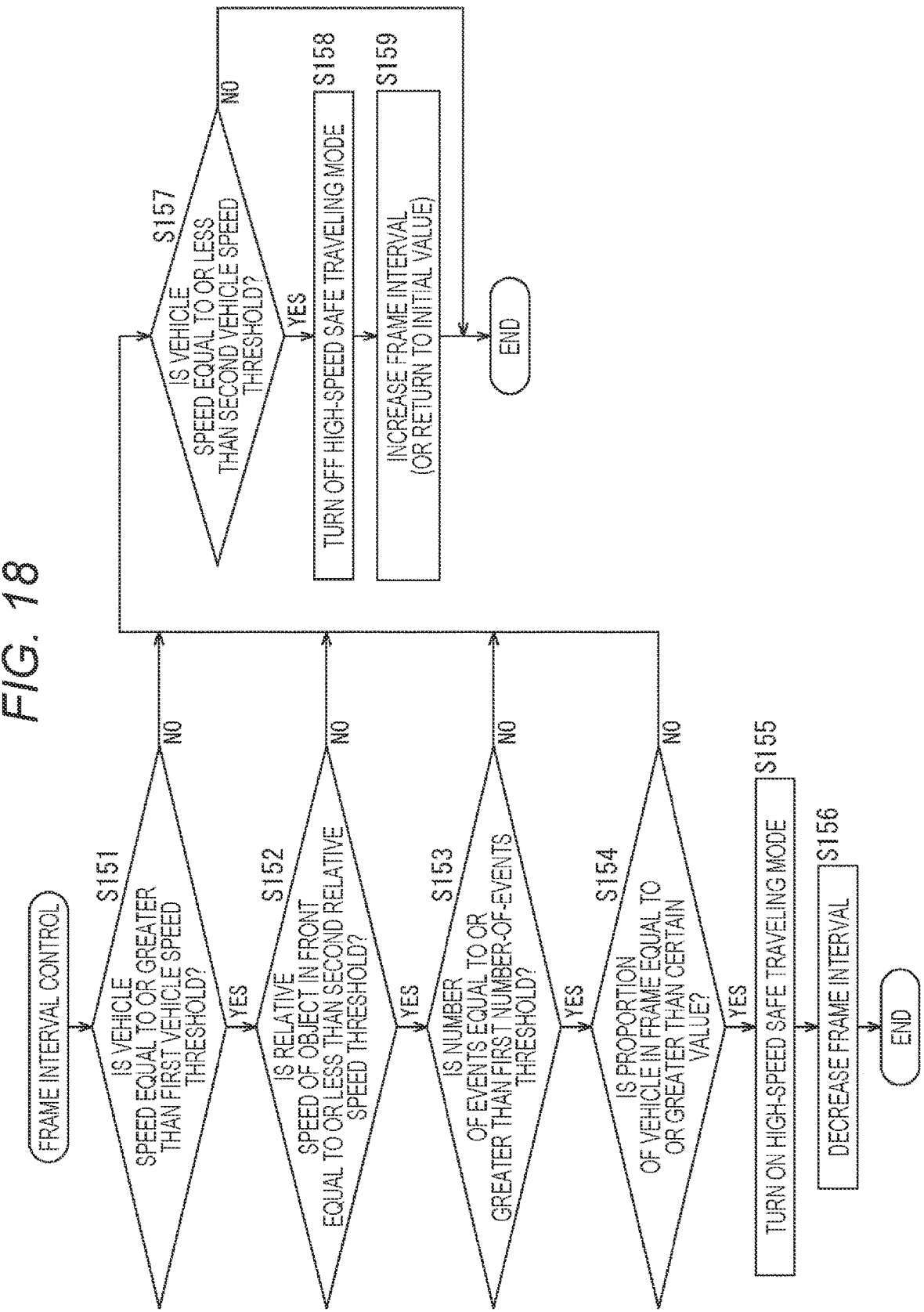
FIG. 18 is a flowchart illustrating a fifth example of the frame interval control in step S14.

FIG. 18 is a flowchart illustrating a fifth example of the frame interval control in step S14 of FIG. 10.

In the fifth example of the frame interval control, the frame interval is controlled according to the vehicle speed of the host vehicle included in the vehicle information, the relative speed of the object in front of the host vehicle, the number of events per unit time, and another vehicle recognized by the object recognition of the data processing unit 14.

In step S151, the control unit 12 determines whether the vehicle speed is equal to or greater than the first vehicle speed threshold, and in a case where it is determined that the vehicle speed is equal to or greater than the first vehicle speed threshold, the process proceeds to step S152.

In step S152, the control unit 12 determines whether the relative speed of the object in front of the host vehicle is equal to or less than the second relative speed threshold, and in a case where it is determined that the relative speed of the object in front of the host vehicle is equal to or less than the second relative speed threshold, the process proceeds to step S153.

In step S153, the control unit 12 determines whether the number of events per unit time is equal to or greater than the first number-of-events threshold, and in a case where it is determined that the number of events per unit time is equal to or greater than the first number-of-events threshold, the process proceeds to step S154.

In step S154, for example, similarly to step S133 in FIG. 15, the control unit 12 determines whether the proportion of other vehicles in the frame is equal to or greater than a certain value according to other vehicles recognized by the object recognition of the data processing unit 14 for the frame data generated immediately before.

In a case where it is determined in step S154 that the proportion of other vehicles in the frame is equal to or greater than the certain value, the process proceeds to step S155.

In step S155, the control unit 12 requests a driving assistance system (not illustrated) to turn on a high-speed safe traveling mode, and the process proceeds to step S156. Therefore, in a case where the host vehicle is traveling at a high speed on an expressway, for example, and other vehicles around the host vehicle are also traveling at a high speed, the high-speed safe traveling mode is turned on when the other vehicle appearing large in the frame repeats a lane change and the detection frequency of the event is high, for example. In the high-speed safe traveling mode, for example, processing of enhancing monitoring of the surroundings of the host vehicle is performed in order to cope with interruption of another vehicle and to enable to look around the host vehicle, such as outputting an alarm and activating a camera as another sensor other than the sensor module of FIG. 1.

In step S156, the control unit 12 controls the frame interval so that the frame interval is shorter than the current value, and the process ends. Therefore, for example, as described above, in a case where the host vehicle is traveling at a high speed on an expressway and the other vehicles around the host vehicle are also traveling at a high speed, when the other vehicle appearing large in the frame repeats a lane change and the detection frequency of the event is high, for example, the high-speed safe traveling mode is turned on, and in addition, the frame data of a high frame rate is generated to cope with a sudden interruption of the other vehicles around the host vehicle.

On the other hand, the process proceeds to step S157 in any of a case where it is determined in step S151 that the vehicle speed is not equal to or greater than the first vehicle speed threshold, a case where it is determined in step S152 that the relative speed of the object in front of the host vehicle is not equal to or less than the second relative speed threshold, a case where it is determined in step S153 that the number of events per unit time is not equal to or greater than the first number-of-events threshold, and a case where it is determined in step S154 that the proportion of other vehicles in the frame is not equal to or greater than a certain value.

In step S157, the control unit 12 determines whether the vehicle speed is equal to or less than the second vehicle speed threshold, and in a case where it is determined that the vehicle speed is not equal to or less than the second vehicle speed threshold, the process ends.

If it is determined in step S157 that the vehicle speed is equal to or less than the second vehicle speed threshold, the process proceeds to step S158.

In step S158, the control unit 12 requests the driving assistance system to turn off the high-speed safe traveling mode, and the process proceeds to step S159. Therefore, for example, when the host vehicle gets off a highway or enters a parking area, the high-speed safe traveling mode is turned off. When the high-speed safe traveling mode is turned off in a case where the process of step S158 is performed, the process of step S158 is skipped.

In step S159, the control unit 12 controls the frame interval so that the frame interval is longer than the current value or returns to the initial value, and the process ends. Therefore, for example, as described above, the frame rate of the frame data decreases, for example, when the host vehicle gets off a highway or enters a parking area, or the like. In this case, power consumption can be suppressed.

<Sixth Example of Frame Interval Control>

Figure 19:
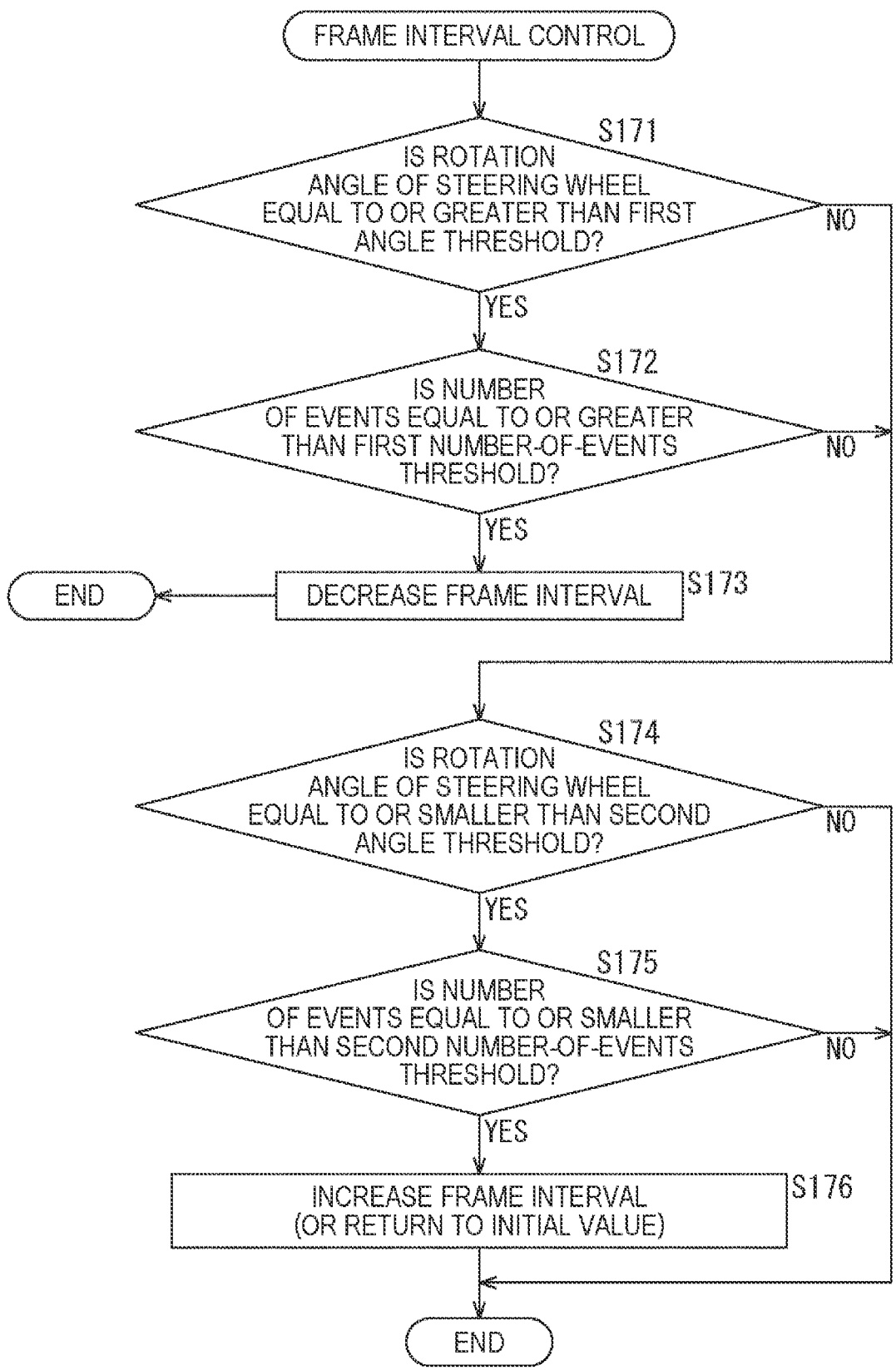
FIG. 19 is a flowchart illustrating a sixth example of the frame interval control in step S14.

FIG. 19 is a flowchart illustrating a sixth example of the frame interval control in step S14 of FIG. 10.

In the sixth example of the frame interval control, the frame interval is controlled according to the steering wheel information of the host vehicle included in the vehicle information and the number of events per unit time.

In step S171, the control unit 12 determines whether the rotation angle of the steering wheel as the steering wheel information is equal to or greater than the first angle threshold, and in a case where it is determined that the rotation angle of the steering wheel is equal to or greater than the first angle threshold, the process proceeds to step S172.

In step S172, the control unit 12 determines whether the number of events per unit time is equal to or greater than the first number-of-events threshold, and in a case where it is determined that the number of events per unit time is equal to or greater than the first number-of-events threshold, the process proceeds to step S173.

In step S173, the control unit 12 controls the frame interval so that the frame interval is shorter than the current value, and the process ends. Therefore, for example, in a case where the host vehicle is traveling while turning the steering wheel suddenly and the detection frequency of the event is high, the frame data of the high frame rate is generated.

On the other hand, in a case where it is determined in step S171 that the rotation angle of the steering wheel is not equal to or greater than the first angle threshold, and in a case where it is determined in step S172 that the number of events per unit time is not equal to or greater than the first event number threshold, the process proceeds to step S174.

In step S174, the control unit 12 determines whether the rotation angle of the steering wheel is equal to or smaller than the second angle threshold, and in a case where it is determined that the rotation angle of the steering wheel is equal to or smaller than the second angle threshold, the process proceeds to step S175.

In step S175, the control unit 12 determines whether the number of events per unit time is equal to or smaller than the second number-of-events threshold, and in a case where it is determined that the number of events per unit time is equal to or smaller than the second number-of-events threshold, the process proceeds to step S176.

In step S176, the control unit 12 controls the frame interval so that the frame interval is longer than the current value or returns to the initial value, and the process ends. Therefore, for example, in a case where the host vehicle travels almost straight and the detection frequency of the event is low, the frame rate of the frame data decreases. In this case, power consumption can be suppressed.

A value equal to or greater than the second angle threshold can be adopted as the first angle threshold (a value equal to or less than the first angle threshold may be adopted as the second angle threshold).

<Seventh Example of Frame Interval Control>

Figure 20:
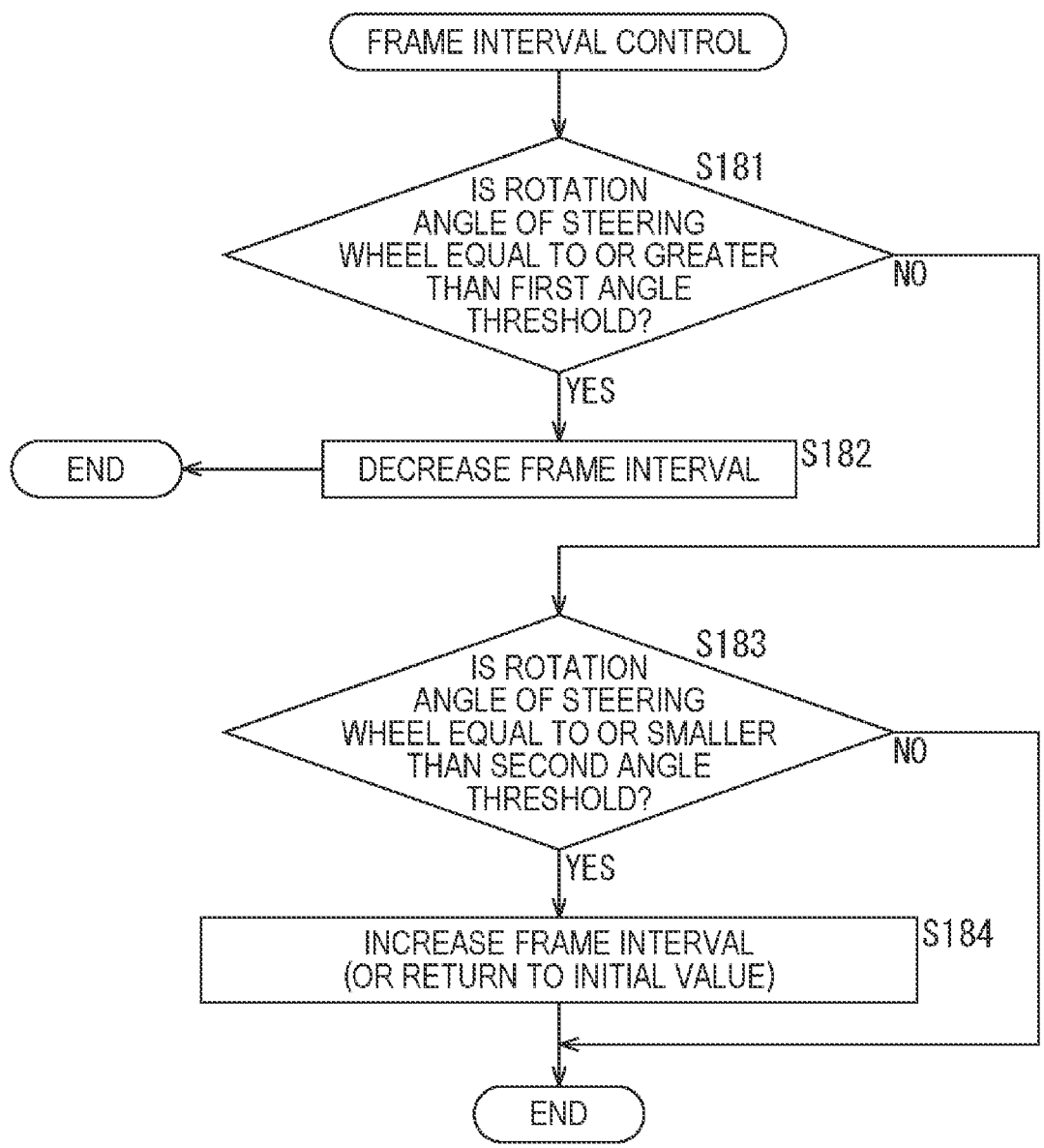
FIG. 20 is a flowchart illustrating a seventh example of the frame interval control in step S14.

FIG. 20 is a flowchart illustrating a seventh example of the frame interval control in step S14 of FIG. 10.

In the seventh example of the frame interval control, the frame interval is controlled according to the steering wheel information of the host vehicle included in the vehicle information.

That is, the seventh example of the frame interval control is similar to the sixth example of the frame interval control (FIG. 19) except that the process of step S172 of determining whether the number of events is equal to or greater than the first event count threshold before the process of step S173 of controlling the frame interval to be short and the process of step S175 of determining whether the number of events is equal to or smaller than the second event count threshold before the process of step S176 of performing control so that the frame interval is increased or returns to the initial value are omitted from FIG. 19.

Therefore, in the seventh example of the frame interval control, processes similar to those in steps S171, S173, S174, and S176 in FIG. 19 are performed in steps S181 to 184, respectively.

<Eighth Example of Frame Interval Control>

Figure 21:
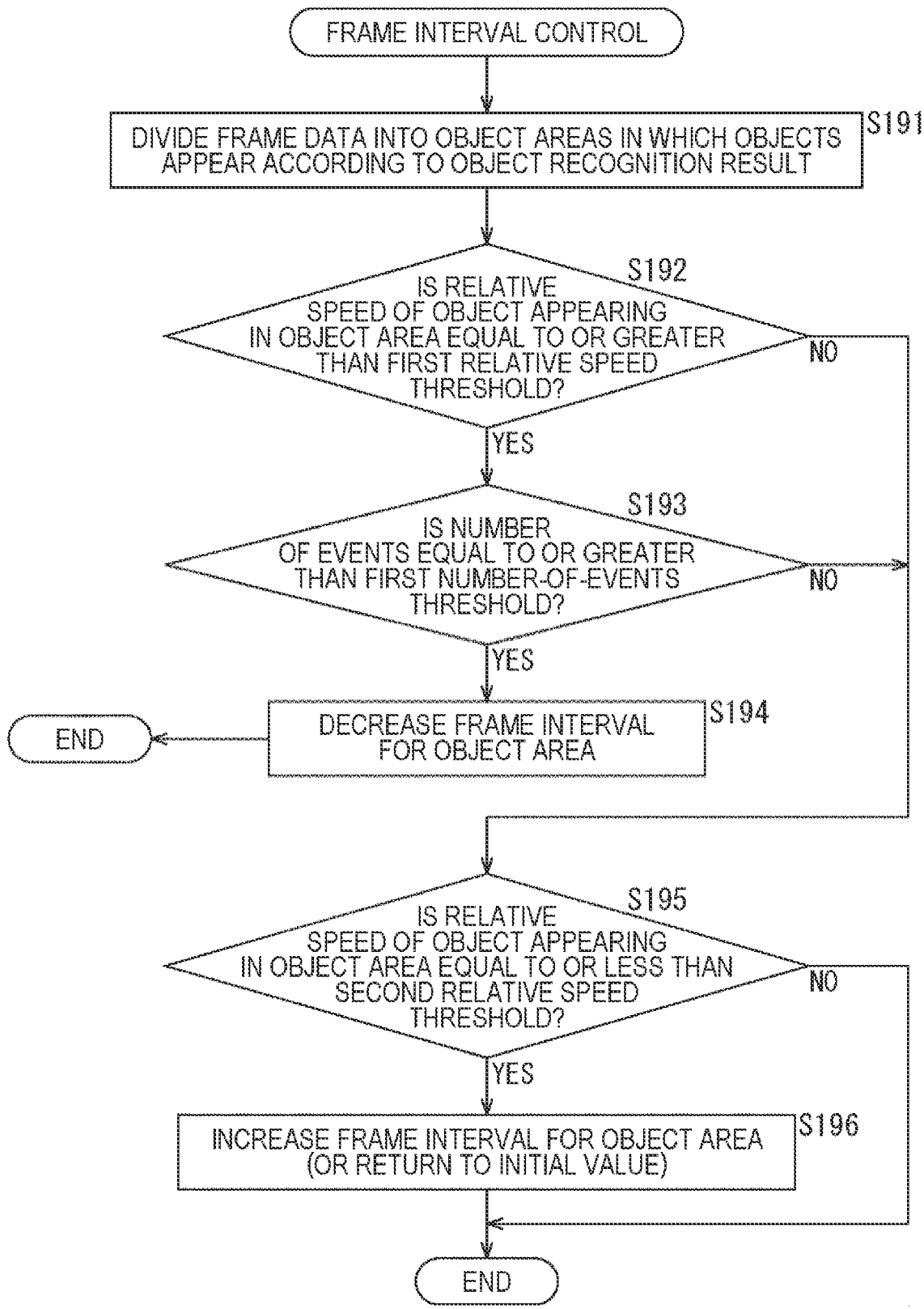
FIG. 21 is a flowchart illustrating an eighth example of the frame interval control in step S14.

FIG. 21 is a flowchart illustrating an eighth example of the frame interval control in step S14 of FIG. 10.

In the eighth example of the frame interval control, the frame interval is controlled for each area in which an object appears in the frame data.

In step S191, the control unit 12 divides the frame data into object areas in which the object recognized by the object recognition appears according to the recognition result (object recognition result) of the object recognition performed by the data processing unit 14, and the process proceeds to step S192.

Hereinafter, the processing in steps S192 to S196 is performed for each object area.

In step S192, the control unit 12 determines whether the relative speed of the object appearing in the object area is equal to or greater than the first relative speed threshold, and in a case where it is determined that the relative speed of the object appearing in the object area is equal to or greater than the first relative speed threshold, the process proceeds to step S193.

In step S193, the control unit 12 determines whether the number of events per unit time in the object area is equal to or greater than the first number-of-events threshold, and in a case where it is determined that the number of events per unit time is equal to or greater than the first number-of-events threshold, the process proceeds to step S194.

In step S194, the control unit 12 controls the frame interval for the object area so that the frame interval is shorter than the current value, and the process ends. Therefore, the frame data of a high frame rate is generated for the object area in which the object with the high relative speed appears and the detection frequency of the event is high.

On the other hand, the process proceeds to step S195 in any of a case where it is determined in step S192 that the relative speed of the object appearing in the object area is not equal to or greater than the first relative speed threshold and a case where it is determined in step S193 that the number of events per unit time in the object area is not equal to or greater than the first number-of-events threshold.

In step S195, the control unit 12 determines whether the relative speed of the object appearing in the object area is equal to or less than the second relative speed threshold, and in a case where it is determined that the relative speed of the object appearing in the object area is equal to or less than the second relative speed threshold, the process proceeds to step S196.

In step S196, the control unit 12 controls the frame interval so that the frame interval is longer than the current value or returns to the initial value, and the process ends. Therefore, the frame rate of the frame data decreases for an object area in which an object with a low relative speed appears. In this case, power consumption can be suppressed.

Figure 22:
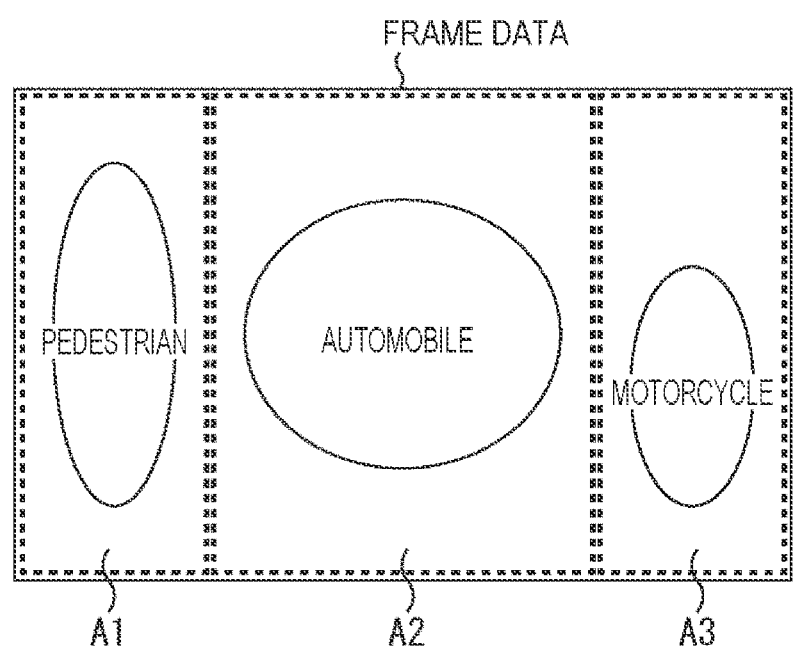
FIG. 22 is a diagram illustrating an example of division of frame data into object areas.

FIG. 22 is a diagram illustrating an example of division of frame data into object areas.

In FIG. 22, a pedestrian appearing in the left part of the frame data, an automobile appearing in the center part, and a motorcycle appearing in the right part are recognized by object recognition. The frame data is divided into an object area A1 in the left part in which a pedestrian appears, an object area A2 in the center part in which an automobile appears, and an object area A3 in the right part in which a motorcycle appears.

It is assumed that a host vehicle, an automobile, and a motorcycle are traveling on a general road, and a pedestrian is walking on the general road. In this case, assuming that the automobile and the motorcycle are traveling at substantially the same speed as the host vehicle, for example, the relative speed of the automobile and the motorcycle is equal to or less than the second relative speed threshold, and the relative speed of the pedestrian is equal to or greater than the first relative speed threshold. Furthermore, it is assumed that the number of events per unit time in the object area in which the pedestrian appears is equal to or greater than the first number-of-events threshold.

In this case, the frame interval of the object area A1 in which the pedestrian appears becomes shorter, and the frame interval of the object area A2 in which the automobile appears and the object area A3 in which the motorcycle appears becomes longer. For example, by treating each object area as a separate frame, the frame interval can be controlled for each object area as described above.

The control of the frame interval for each object area can be performed apparently by handling each object area as a separate frame and copying the object area of the previous frame to the object area of the current frame.

Figure 23:
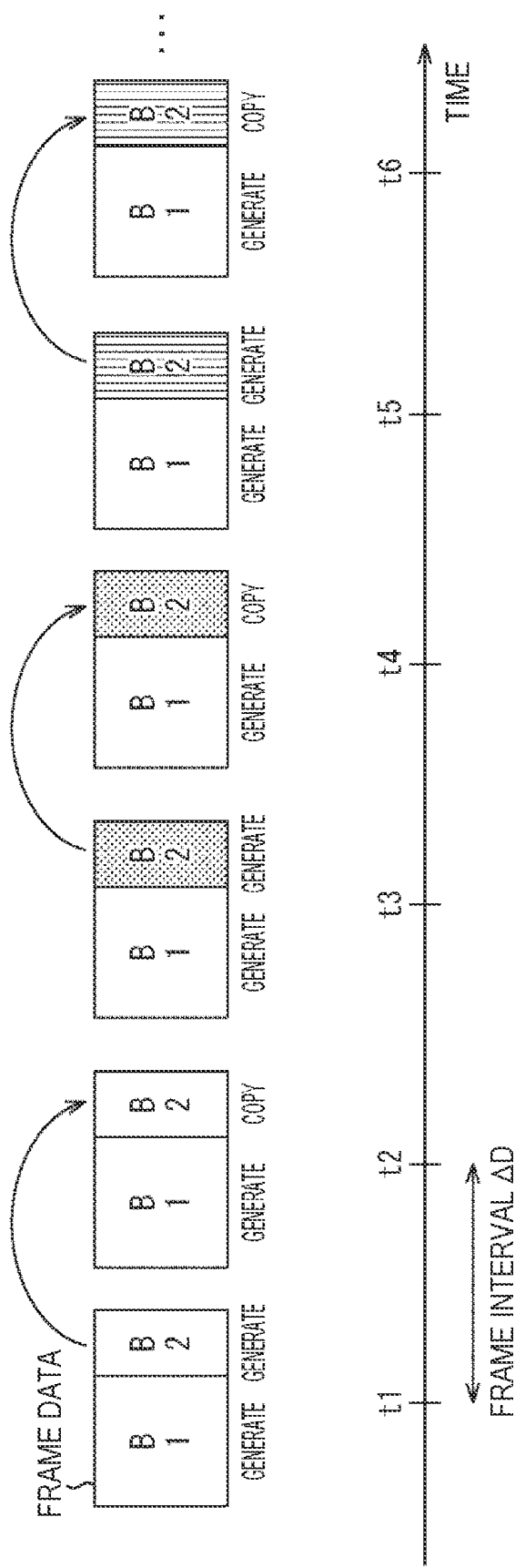
FIG. 23 is a diagram for explaining control of a frame interval for each apparent object area.

FIG. 23 is a diagram illustrating such control of the frame interval for each apparent object area.

In FIG. 23, the frame data is divided into object areas B1 and B2.

In FIG. 23, for the object areas B1 and B2, the frame interval of the object area B1 is controlled to the shortest time AD in the object area, and the frame interval of the object area B2 is controlled to twice the frame interval AD of the object area B1.

In this case, the frame data is generated for each shortest frame interval AD. However, for the object area B1, the frame data is generated for each shortest frame interval AD, but for the object area B2, the frame data is generated for each frame interval ADx2 that is twice the shortest frame interval AD. Furthermore, for the object area B2, at the time at which no frame data is generated among the times at the shortest frame interval AD, the frame data generated at the latest time at which the frame data is generated is copied.

That is, assuming that the time for each frame interval AD is represented as t1, t2, . . . , and so on, the frame data of the object areas B1 and B2 is generated from the event data at time t1.

At time t2, the frame data of the object area B1 is generated from the event data, and the frame data of the object area B2 is generated by copying the frame data at time t1. Then, at time t3, the frame data of the object areas B1 and B2 is generated from the event data. Further, at time t4, the frame data of the object area B1 is generated from the event data, and the frame data of the object area B2 is generated by copying the frame data at time t3. Hereinafter, by similarly generating frame data, it is possible to apparently control the frame interval for each object area.

In the control of the frame interval for each apparent object area as described above, the generation of the frame data of the object area B2 from the event data only needs to be performed at a frequency of ½ of the generation of the frame data of the object area B1 from the event data. For the object area B2, the frame data only needs to be copied at the remaining frequency of ½. Therefore, the processing amount is reduced as compared with a case where the generation of the frame data of the object area B2 from the event data is performed at the same frequency as the generation of the frame data of the object area B1 from the event data, and as a result, the power consumption can be suppressed.

<Description of Computer to which Present Technology is Applied>

Next, the above-described series of processing can be performed by hardware or software. In a case where the series of processing is performed by software, a program constituting the software is installed in a general-purpose computer or the like.

Figure 24:
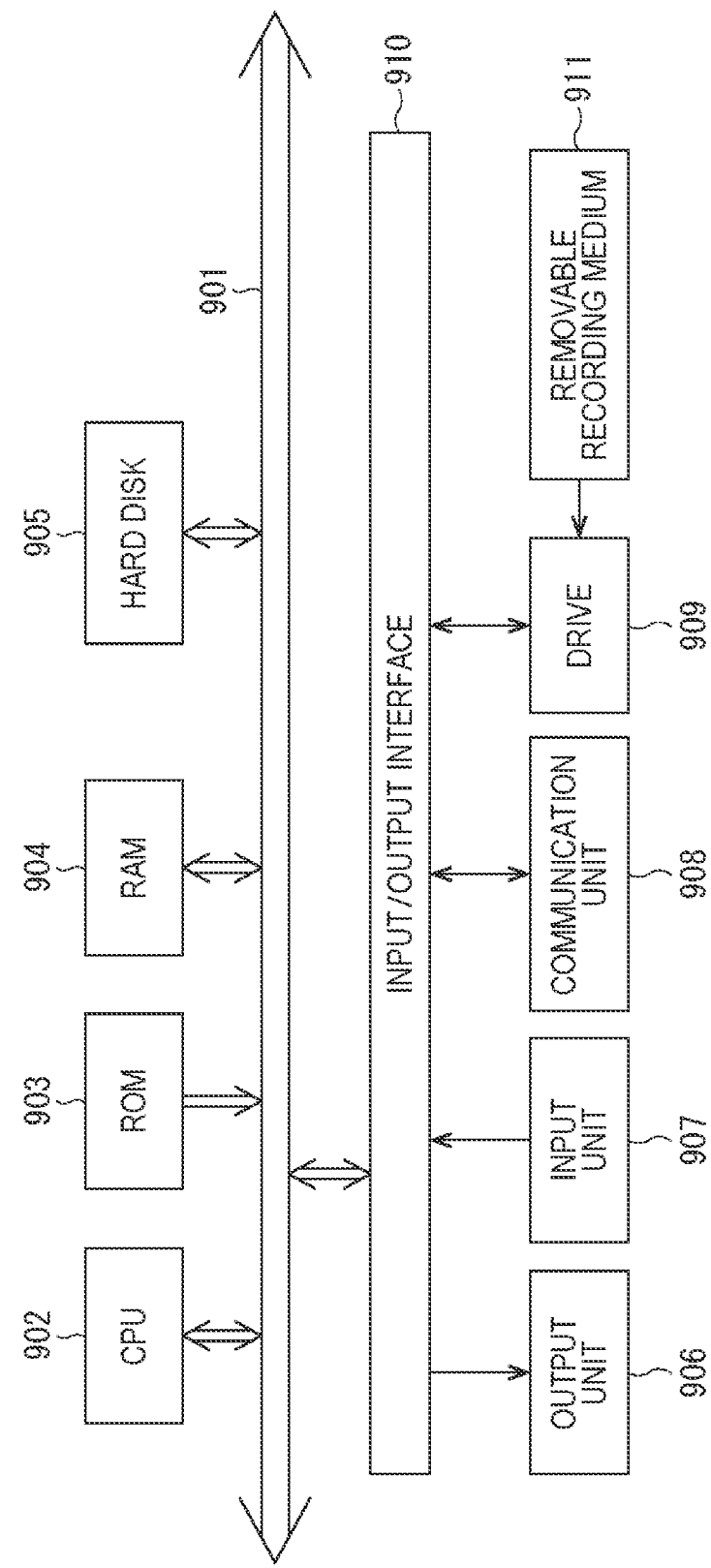
FIG. 24 is a block diagram illustrating a configuration example of an embodiment of a computer to which the present technology is applied.

FIG. 24 is a block diagram illustrating a configuration example of an embodiment of a computer in which a program for executing the above-described series of processing is installed.

The program can be recorded in advance in a hard disk 905 or a ROM 903 as a recording medium built in the computer.

Alternatively, the program can be stored (recorded) in a removable recording medium 911 driven by a drive 909. Such a removable recording medium 911 can be provided as so-called packaged software. Here, examples of the removable recording medium 911 include a flexible disk, a compact disc read only memory (CD-ROM), a magneto optical (MO) disk, a digital versatile disc (DVD), a magnetic disk, a semiconductor memory, and the like.

The program can be installed in the computer from the removable recording medium 911 as described above, or can be downloaded to the computer via a communication network or a broadcast network and installed in the built-in hard disk 905. That is, for example, the program can be wirelessly transferred from a download site to the computer via an artificial satellite for digital satellite broadcasting, or can be transferred by wire to the computer via a network such as a local area network (LAN) or the Internet.

The computer incorporates a central processing unit (CPU) 902, and an input/output interface 910 is connected to the CPU 902 via a bus 901.

When a command is input by a user operating an input unit 907 or the like via the input/output interface 910, the CPU 902 executes a program stored in a read only memory (ROM) 903 according to the command. Alternatively, the CPU 902 loads the program stored in the hard disk 905 into a random access memory (RAM) 904 and executes the program.

As a result, the CPU 902 performs the processing according to the above-described flowchart or the processing performed by the configuration of the above-described block diagram. Then, the CPU 902 outputs the processing result from the output unit 906, transmits the processing result from the communication unit 908, or records the processing result in the hard disk 905 via the input/output interface 910, for example, as necessary.

The input unit 907 includes a keyboard, a mouse, a microphone, and the like. Furthermore, the output unit 906 includes a liquid crystal display (LCD), a speaker, and the like.

Here, in the present specification, the processing performed by the computer according to the program is not necessarily performed in time series in the order described as the flowchart. That is, the processing performed by the computer according to the program also includes processing executed in parallel or individually (for example, parallel processing or processing by an object).

Furthermore, the program may be processed by one computer (processor) or may be processed in a distributed manner by a plurality of computers. Furthermore, the program may be transferred to a remote computer and executed.

Furthermore, in the present specification, a system means a set of a plurality of components (Devices, modules (parts), and the like), and it does not matter whether or not all the components are in the same housing. Therefore, a plurality of devices housed in separate housings and connected via a network and one device in which a plurality of modules is housed in one housing are both systems.

The embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowchart can be executed by one device or can be shared and executed by a plurality of devices.

Furthermore, in a case where a plurality of processes is included in one step, the plurality of processes included in one step can be executed by one device or can be shared and executed by a plurality of devices.

<Application Example to Mobile Body>

The technology according to the present disclosure (present technology) can be applied to various products. For example, the technology according to the present disclosure may be realized as a device mounted on any type of mobile body such as an automobile, an electric vehicle, a hybrid electric vehicle, a motorcycle, a bicycle, a personal mobility, an airplane, a drone, a ship, and a robot.

Figure 25:
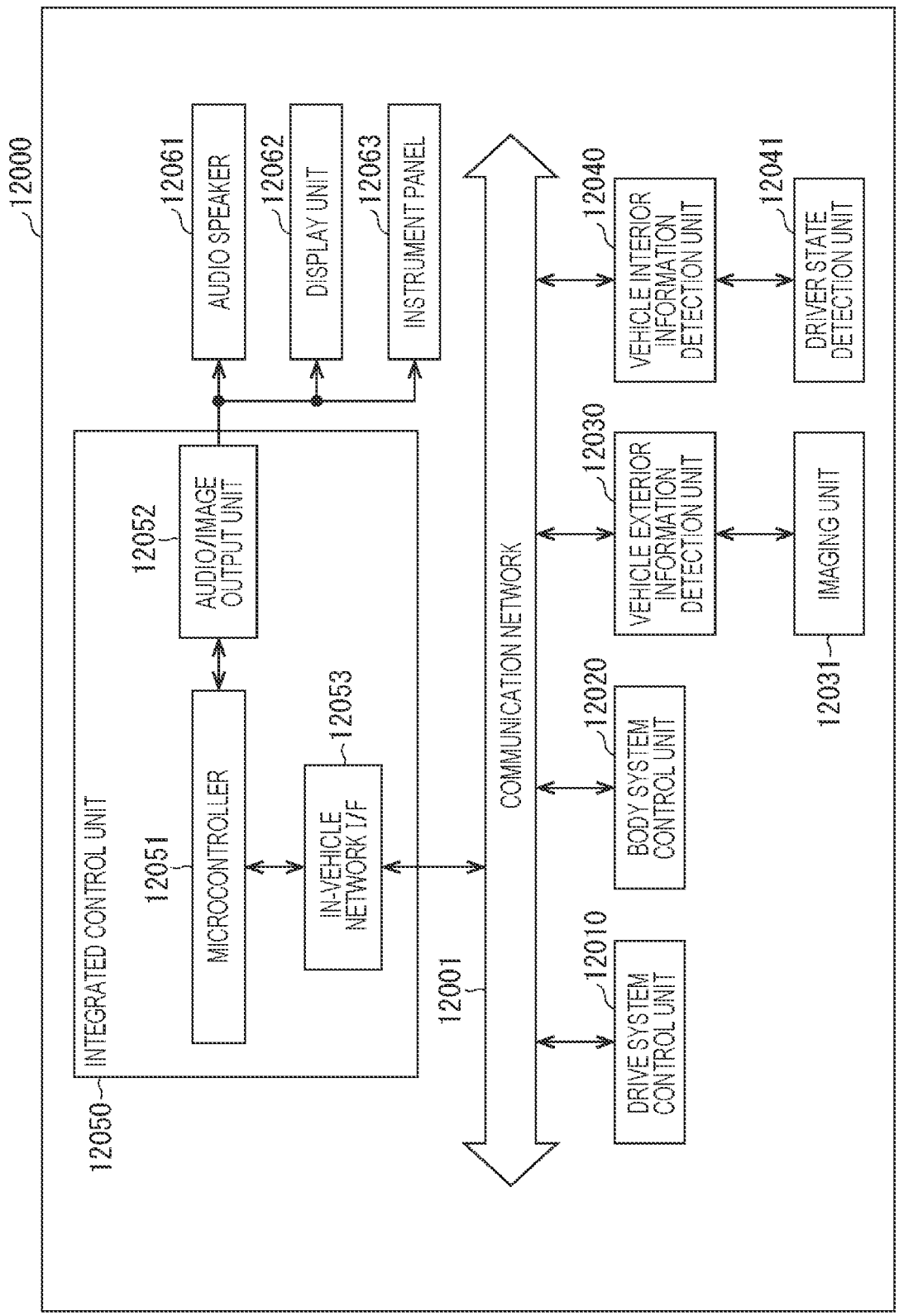
FIG. 25 is a block diagram illustrating an example of a schematic configuration of a vehicle control system.

FIG. 25 is a block diagram illustrating a schematic configuration example of a vehicle control system which is an example of a moving body control system to which the technology according to the present disclosure can be applied.

The vehicle control system 12000 includes a plurality of electronic control units connected via a communication network 12001. In the example illustrated in FIG. 25, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, an audio/image output unit 12052, and an in-vehicle network interface (I/F) 12053 are illustrated.

The drive system control unit 12010 controls the operation of devices related to the drive system of the vehicle according to various programs. For example, the drive system control unit 12010 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like.

The body system control unit 12020 controls operations of various devices mounted on the vehicle body according to various programs. For example, the body system control unit 12020 functions as a control device of a keyless entry system, a smart key system, a power window device, or various lamps such as a head lamp, a back lamp, a brake lamp, a blinker, or a fog lamp. In this case, radio waves transmitted from a portable device that substitutes for a key or signals of various switches can be input to the body system control unit 12020. The body system control unit 12020 receives input of these radio waves or signals, and controls a door lock device, a power window device, a lamp, and the like of the vehicle.

The vehicle exterior information detection unit 12030 detects information outside the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle, and receives the captured image. The vehicle exterior information detection unit 12030 may perform object detection processing or distance detection processing of a person, a vehicle, an obstacle, a sign, a character on a road surface, or the like on the basis of the received image.

The imaging unit 12031 is an optical sensor that receives light and outputs an electrical signal corresponding to the amount of received light. The imaging unit 12031 can output the electrical signal as an image or can output the electrical signal as distance measurement information. Furthermore, the light received by the imaging unit 12031 may be visible light or invisible light such as infrared rays.

The vehicle interior information detection unit 12040 detects information inside the vehicle. For example, a driver state detection unit 12041 that detects a state of a driver is connected to the vehicle interior information detection unit 12040. The driver state detection unit 12041 includes, for example, a camera that images the driver, and the vehicle interior information detection unit 12040 may calculate the degree of fatigue or the degree of concentration of the driver or may determine whether the driver is dozing off on the basis of the detection information input from the driver state detection unit 12041.

The microcomputer 12051 can calculate a control target value of the driving force generation device, the steering mechanism, or the braking device on the basis of the information inside and outside the vehicle acquired by the vehicle exterior information detection unit 12030 or the vehicle interior information detection unit 12040, and output a control command to the drive system control unit 12010. For example, the microcomputer 12051 can perform cooperative control for the purpose of implementing functions of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, or the like.

Furthermore, the microcomputer 12051 controls the driving force generation device, the steering mechanism, the braking device, or the like on the basis of the information around the vehicle acquired by the vehicle exterior information detection unit 12030 or the vehicle interior information detection unit 12040, thereby performing cooperative control for the purpose of automatic driving or the like in which the vehicle autonomously travels without depending on the operation of the driver.

Furthermore, the microcomputer 12051 can output a control command to the body system control unit 12020 on the basis of the vehicle exterior information acquired by the vehicle exterior information detection unit 12030. For example, the microcomputer 12051 can perform cooperative control for the purpose of preventing glare, such as switching from a high beam to a low beam, by controlling the headlamp according to the position of a preceding vehicle or an oncoming vehicle detected by the vehicle exterior information detection unit 12030.

The audio/image output unit 12052 transmits an output signal of at least one of a sound or an image to an output device capable of visually or audibly notifying an occupant of the vehicle or the outside of the vehicle of information. In the example of FIG. 25, an audio speaker 12061, a display unit 12062, and an instrument panel 12063 are illustrated as the output device. The display unit 12062 may include, for example, at least one of an on-board display and a head-up display.

Figure 26:
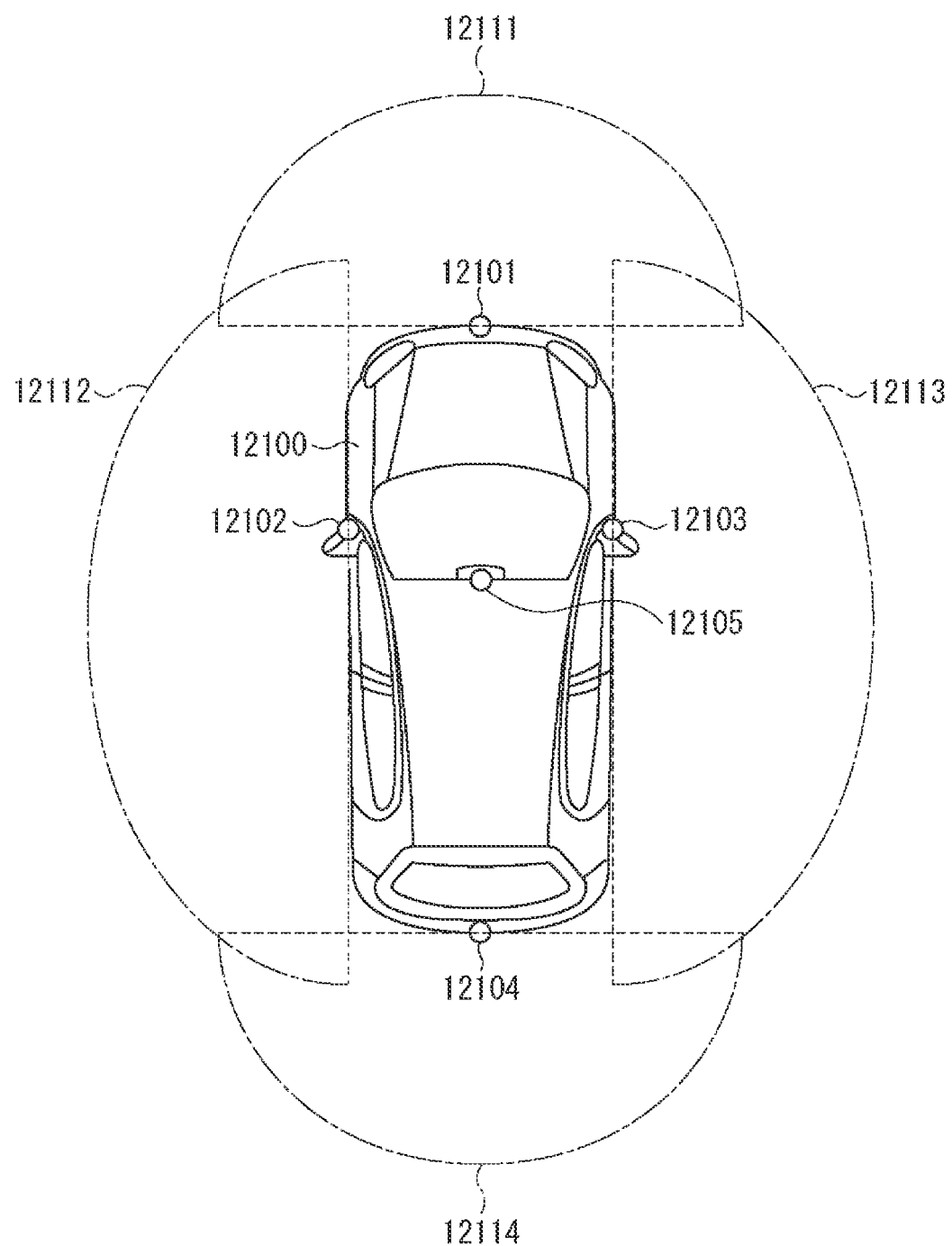
FIG. 26 is an explanatory diagram illustrating an example of installation positions of a vehicle exterior information detection unit and an imaging unit.

FIG. 26 is a diagram illustrating an example of an installation position of the imaging unit 12031.

In FIG. 26, the vehicle 12100 includes imaging units 12101, 12102, 12103, 12104, and 12105 as the imaging unit 12031.

The imaging units 12101, 12102, 12103, 12104, and 12105 are provided, for example, at positions such as a front nose, a side mirror, a rear bumper, a back door, and an upper portion of a windshield in a vehicle interior of the vehicle 12100. The imaging unit 12101 provided at the front nose and the imaging unit 12105 provided at the upper portion of the windshield in the vehicle interior mainly acquire images in front of the vehicle 12100. The imaging units 12102 and 12103 provided at the side mirrors mainly acquire images of the sides of the vehicle 12100. The imaging unit 12104 provided on the rear bumper or the back door mainly acquires an image behind the vehicle 12100. The front images acquired by the imaging units 12101 and 12105 are mainly used for detecting a preceding vehicle, a pedestrian, an obstacle, a traffic light, a traffic sign, a lane, or the like.

FIG. 26 illustrates an example of imaging ranges of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 provided at the side mirrors, respectively, and an imaging range 12114 indicates an imaging range of the imaging unit 12104 provided at the rear bumper or the back door. For example, by superimposing image data captured by the imaging units 12101 to 12104, an overhead view image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object in the imaging ranges 12111 to 12114 and a temporal change of the distance (relative speed with respect to the vehicle 12100) on the basis of the distance information obtained from the imaging units 12101 to 12104, thereby extracting, as a preceding vehicle, a three-dimensional object traveling at a predetermined speed (for example, 0 km/h or more) in substantially the same direction as the vehicle 12100, in particular, the closest three-dimensional object on a traveling path of the vehicle 12100. Furthermore, the microcomputer 12051 can set an inter-vehicle distance to be secured in advance in front of the preceding vehicle, and can perform automatic brake control (including follow-up stop control), automatic acceleration control (including follow-up start control), and the like. As described above, it is possible to perform cooperative control for the purpose of automatic driving or the like in which the vehicle autonomously travels without depending on the operation of the driver.

For example, on the basis of the distance information obtained from the imaging units 12101 to 12104, the microcomputer 12051 can classify and extract three-dimensional object data regarding three-dimensional objects into two-wheeled vehicles, ordinary vehicles, large vehicles, pedestrians, and other three-dimensional objects such as utility poles, and use the three-dimensional object data for automatic avoidance of obstacles. For example, the microcomputer 12051 identifies obstacles around the vehicle 12100 as obstacles that can be visually recognized by the driver of the vehicle 12100 and obstacles that are difficult to visually recognize. Then, the microcomputer 12051 determines a collision risk indicating a risk of collision with each obstacle, and when the collision risk is equal to or greater than a set value and there is a possibility of collision, the microcomputer 12051 can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian is present in the images captured by the imaging units 12101 to 12104. Such pedestrian recognition is performed by, for example, a procedure of extracting feature points in the images captured by the imaging units 12101 to 12104 as infrared cameras, and a procedure of performing pattern matching processing on a series of feature points indicating an outline of an object to determine whether or not the object is a pedestrian. When the microcomputer 12051 determines that a pedestrian is present in the images captured by the imaging units 12101 to 12104 and recognizes the pedestrian, the audio/image output unit 12052 controls the display unit 12062 to display a square contour line for emphasis to be superimposed on the recognized pedestrian. Furthermore, the audio/image output unit 12052 may control the display unit 12062 to display an icon or the like indicating a pedestrian at a desired position.

An example of the vehicle control system to which the technology according to the present disclosure can be applied has been described above. The technology according to the present disclosure can be applied to, for example, the imaging unit 12031 among the above-described configurations. Specifically, the sensor module in FIG. 1 can be applied to the imaging unit 12031. By applying the technology according to the present disclosure to the imaging unit 12031, appropriate driving support can be performed with low power consumption.

The embodiments of the present technology are not limited to the above-described embodiments, and various modifications can be made without departing from the gist of the present technology.

Furthermore, the effects described in the present specification are merely examples and are not limited thereto, and other effects may be provided.

The present technology can have the following configurations.

<1>
A data processing device including:
a vehicle information acquisition unit that acquires vehicle information that can be acquired by a vehicle;
a control unit that controls, according to the vehicle information, a frame rate of frame data generated on the basis of event data representing the occurrence of an event that occurs in an accumulation time from a start of frame generation to an end of frame generation and is a change in an electrical signal of a pixel that generates the electrical signal by performing photoelectric conversion; and
a data processing unit that generates the frame data of the frame rate.

<2>
The data processing device according to <1>, in which
the control unit controls a frame interval which is an interval between pieces of frame data generated continuously.

<3>
The data processing device according to <1>, in which
the control unit controls a frame width that is the time from a start of frame generation to an end of frame generation of the frame data.

<4>
The data processing device according to <1>, in which
the control unit controls a start interval that is an interval from a start of generation of first frame data to a start of generation of next second frame data.

<5>
The data processing device according to <1>, in which
the control unit controls the frame rate according to the number of events per unit time.

<6>
The data processing device according to any one of <1> to <5>, in which
the data processing unit performs object recognition using the frame data, and
the control unit controls the frame rate according to a recognition result of the object recognition.

<7>
The data processing device according to <6>, in which
the control unit controls the frame rate according to another vehicle recognized by the object recognition.

<8>
The data processing device according to <7>, in which
the control unit controls the frame rate according to a proportion of the other vehicle recognized by the object recognition in the frame.

<9>
The data processing device according to any one of <6> to <8>, further including
a camera that outputs frame data of a color image, in which the data processing unit performs the object recognition using the frame data generated according to the event data and frame data of a color image.

<10>

The data processing device according to any one of <1> to <9>, in which the vehicle information includes a vehicle speed of the vehicle, and the control unit controls the frame rate according to a vehicle speed of the vehicle.

<11>

The data processing device according to any one of <1> to <9>, in which the vehicle information includes a relative speed of an object with respect to the vehicle, and the control unit controls the frame rate according to a relative speed of the object.

<12>

The data processing device according to <11>, in which the control unit controls the frame rate according to a relative speed of an object having a highest relative speed among a plurality of objects or an object designated by a user.

<13>

The data processing device according to any one of <1> to <9>, in which the vehicle information includes steering wheel information related to an operation of a steering wheel of the vehicle, and the control unit controls the frame rate according to the steering wheel information.

<14>

The data processing device according to any one of <1> to <9>, in which the control unit controls the frame rate for each area in which an object appears in the frame data.

<15>

The data processing device according to any one of <1> to <14>, further including a sensor that performs the photoelectric conversion and outputs the event data.

<16>

A data processing method including:

acquiring vehicle information that can be acquired by a vehicle;

controlling, according to the vehicle information, a frame rate of frame data generated on the basis of event data representing the occurrence of an event that occurs in an accumulation time from a start of frame generation to an end of frame generation and is a change in an electrical signal of a pixel that generates the electrical signal by performing photoelectric conversion; and generating the frame data of the frame rate.

<17>

A program for causing a computer to function as:

a vehicle information acquisition unit that acquires vehicle information that can be acquired by a vehicle;

a control unit that controls, according to the vehicle information, a frame rate of frame data generated on the basis of event data representing the occurrence of an event that occurs in an accumulation time from a start of frame generation to an end of frame generation and is a change in an electrical signal of a pixel that generates the electrical signal by performing photoelectric conversion; and a data processing unit that generates the frame data of the frame rate.

REFERENCE SIGNS LIST

11 Vehicle information acquisition unit
12 Control unit
13 DVS
14 Data processing unit
15 RGB camera
31 Pixel array unit
32 Drive unit
33 Arbiter
34 AD conversion unit
35 Output unit
41 Pixel block
51 Pixel
52 Event detection unit
53 Pixel signal generation unit
60 Node
61 Photoelectric conversion element
62, 63 Transfer transistor
71 Reset transistor
72 Amplification transistor
73 Selection transistor
74 FD
81 Current-voltage conversion unit
82 Buffer
83 Subtractor
84 Quantizer
85 Transfer unit
91 to 93 FET
101 Capacitor
102 Operational amplifier
103 Capacitor
104 Switch
111 Comparator
121 Frame interval setting unit
122 Frame width setting unit
123 Data generation unit
124 Image processing unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. A data processing device, comprising:
a processor configured to:
receive vehicle information, wherein the vehicle information is acquired by a first vehicle;
control, based on the vehicle information and number of events per unit time, a frame rate of frame data, wherein
the frame data is generated based on event data,
the event data represents occurrence of an event that occurs in an accumulation time from a start of frame generation to an end of frame generation,
the event is a change in an electrical signal of a pixel, and the pixel generates the electrical signal based on photoelectric conversion; and
generate the frame data of the frame rate.

2. The data processing device according to claim 1, wherein the processor is further configured to control a frame interval which is an interval between pieces of frame data generated continuously.

3. The data processing device according to claim 1, wherein the processor is further configured to control a frame width that is a time from the start of frame generation to the end of frame generation of the frame data.

4. The data processing device according to claim 1, wherein the processor is further configured to control a start interval that is an interval from a start of generation of first piece of frame data to a start of generation of a second piece of frame data that is next to the first piece of frame data.

5. The data processing device according to claim 1, wherein the processor is further configured to:
perform object recognition based on the frame data, and
control the frame rate based on a recognition result of the object recognition.

6. The data processing device according to claim 5, wherein
the processor is further configured to control the frame rate based on a second vehicle recognized by the object recognition, and
the second vehicle is different from the first vehicle.

7. The data processing device according to claim 6, wherein the processor is further configured to control the frame rate based on a proportion of the second vehicle recognized by the object recognition in the frame data.

8. The data processing device according to claim 5, further comprising
a camera configured to output frame data of a color image, wherein the processor is further configured to perform the object recognition based on the frame data generated according to the event data and the frame data of the color image.

9. The data processing device according to claim 1, wherein
the vehicle information includes a vehicle speed of the first vehicle, and
the processor is further configured to control the frame rate based on the vehicle speed of the first vehicle.

10. The data processing device according to claim 1, wherein
the vehicle information includes a relative speed of an object with respect to the first vehicle, and
the processor is further configured to control the frame rate based on the relative speed of the object.

11. The data processing device according to claim 7, wherein the processor is further configured to control the frame rate based on a relative speed of an object having a highest relative speed among a plurality of objects or an object designated by a user.

12. The data processing device according to claim 1, wherein
the vehicle information includes steering wheel information related to an operation of a steering wheel of the first vehicle, and
the processor is further configured to control the frame rate based on the steering wheel information.

13. The data processing device according to claim 1, wherein the processor is further configured to control the frame rate for each area in which an object appears in the frame data.

14. The data processing device according to claim 1, further comprising
a sensor configured to perform the photoelectric conversion and output the event data.

15. A data processing method, comprising:
receiving vehicle information, wherein the vehicle information is acquired by a vehicle;
controlling, based on the vehicle information and number of events per unit time, a frame rate of frame data, wherein
the frame data is generated based on event data,
the event data represents occurrence of an event that occurs in an accumulation time from a start of frame generation to an end of frame generation,
the event is a change in an electrical signal of a pixel, and
the pixel generates the electrical signal based on photoelectric conversion; and
generating the frame data of the frame rate.

16. A non-transitory computer-readable medium having stored thereon computer-executable instructions, which when executed by a computer, cause the computer to execute operations, the operations comprising:
receiving vehicle information, wherein the vehicle information is acquired by a vehicle;
controlling, based on the vehicle information and number of events per unit time, a frame rate of frame data, wherein
the frame data is generated based on event data,
the event data represents occurrence of an event that occurs in an accumulation time from a start of frame generation to an end of frame generation,
the event is a change in an electrical signal of a pixel, and
the pixel generates the electrical signal based on photoelectric conversion; and
generating the frame data of the frame rate.

* * * * *